US006300241B1

(12) United States Patent
Moore et al.

(10) Patent No.: US 6,300,241 B1
(45) Date of Patent: Oct. 9, 2001

(54) SILICON INTERCONNECT PASSIVATION AND METALLIZATION PROCESS OPTIMIZED TO MAXIMIZE REFLECTANCE

(75) Inventors: Paul M. Moore, Burlingame; Kevin Carl Brown, Sunnyvale; Richard Luttrell, Scotts Valley, all of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/136,627

(22) Filed: Aug. 19, 1998

(51) Int. Cl.$^7$ .............................................. H01L 21/4763
(52) U.S. Cl. ........................... 438/637; 438/30; 438/624; 438/633; 438/692
(58) Field of Search ....................... 438/582, 622, 438/626, 628, 629, 631, 633, 637, 648, 654, 618, 152, 30, 623, 624, 690–694, 697, 699, 703

(56) References Cited

U.S. PATENT DOCUMENTS

| | | | |
|---|---|---|---|
| 3,862,360 | 1/1975 | Dill et al. | 348/792 |
| 4,024,626 | 5/1977 | Leupp et al. | 438/30 |
| 4,103,297 | 7/1978 | McGreivy et al. | 345/90 |
| 4,125,446 | 11/1978 | Hartsough et al. | 204/192.27 |
| 4,185,894 | 1/1980 | Hilton et al. | 349/114 |

(List continued on next page.)

FOREIGN PATENT DOCUMENTS 3853698 t2   3/2001  (DE) ............................... G02F/1/137

OTHER PUBLICATIONS

Cacharelis, P., et al., "A 0.8 μm CMOS, Double Polysilicon EEPROM Technology Module Optimized for Minimum Wafer", 24th Proceedings of European Solid State Device Research Conference (ESSDERC). pp. 195–198.

Nagae, Y., et al., "16.1: Invited Paper: Compact Liquid–Crystal Projectors with High Optical Efficiency", SID 95 Digest, pp. 223–226 (1995).

Stearns, D.G., "The scattering of x rays from nonidal multilayer structures", 1988 American Institute of Physics, pp. 491–506.

Frear, D. R., et al., "Structure and Properties of Al–a Si Thin Films on Si as a Function of Gas Impurities During DC Magnetron–Sputtered Deposition", Journal of Electronic Materials, vol. 18, No. 4, pp. 517–525 (1989).

(List continued on next page.)

Primary Examiner—Carl Whitehead, Jr.
Assistant Examiner—Jamie L. Brophy
(74) Attorney, Agent, or Firm—Stallman & Pollock LLP

(57) ABSTRACT

A metal surface having optimized reflectance is created utilizing the following process steps alone or in combination: 1) CMP of dielectric layer underlying the metal following SOG planarization; 2) CMP of dielectric layer underlying the metal following formation of vias; 3) forming a metal adhesion layer composed of collimated titanium over the underlying dielectric; 4) depositing metal upon the adhesion layer at as low a temperature as feasible to maintain small grain size; 5) depositing at least the first layer of the reflectance enhancing coating on top of the freshly deposited metal prior to etching the metal; and 6) depositing the initial layer of the reflective enhancing coating at a temperature as close as possible to the temperature of formation of the metal electrode layer in order to suppress hillock formation in the metal. Deposition of the REC serves two distinct purposes. First, the REC coats the freshly deposited metal layer immediately following deposition, preserving the metal in its highly reflective state. Second, the REC generates constructive interference of light reflected by the metal layer. This constructive interference can generate reflectivity greater than that of the bare metal surface.

11 Claims, 38 Drawing Sheets

U.S. PATENT DOCUMENTS

| | | | |
|---|---|---|---|
| 4,191,452 | | 3/1980 | Grinberg et al. ............... 349/28 |
| 4,239,346 | | 12/1980 | Lloyd ............................ 349/44 |
| 4,302,498 | | 11/1981 | Faith ............................. 428/209 |
| 4,382,658 | | 5/1983 | Shields et al. ................. 349/122 |
| 4,431,271 | | 2/1984 | Okubo ........................... 349/42 |
| 4,470,060 | | 9/1984 | Yamazaki ...................... 349/46 |
| 4,566,177 | * | 1/1986 | van de Ven et al. ........... 438/660 |
| 4,602,850 | | 7/1986 | DeBenedetti ................... 349/41 |
| 4,839,707 | | 6/1989 | Shields .......................... 257/350 |
| 4,999,619 | | 3/1991 | Te Velde ........................ 349/167 |
| 5,159,476 | | 10/1992 | Hayashi ......................... 349/39 |
| 5,244,534 | | 9/1993 | Yu et al. ........................ 438/672 |
| 5,365,355 | | 11/1994 | Hastings et al. ............... 349/42 |
| 5,399,236 | | 3/1995 | Ha et al. ........................ 438/720 |
| 5,461,501 | | 10/1995 | Sato et al. ..................... 349/42 |
| 5,473,448 | | 12/1995 | Yoshinaga et al. ............ 349/89 |
| 5,496,773 | * | 3/1996 | Rhodes et al. ................. 438/626 |
| 5,497,025 | | 3/1996 | Wong ............................ 257/435 |
| 5,580,823 | * | 12/1996 | Hedge et al. .................. 438/648 |
| 5,702,980 | * | 12/1997 | Yu et al. ........................ 438/623 |
| 5,706,067 | | 1/1998 | Colgan et al. ................. 349/114 |
| 5,710,460 | | 1/1998 | Leidy et al. ................... 257/752 |
| 5,728,621 | * | 3/1998 | Zheng et al. .................. 438/427 |
| 5,764,324 | | 6/1998 | Lu et al. ........................ 349/113 |
| 5,838,715 | | 11/1998 | Corzine et al. ................ 372/96 |
| 5,981,404 | * | 11/1999 | Sheng et al. ................... 438/791 |
| 5,985,755 | * | 11/1999 | Bajaj et al. .................... 438/645 |
| 5,994,156 | * | 11/1999 | Voutsas et al. ................ 438/30 |
| 6,017,780 | * | 1/2000 | Roy ............................... 438/152 |
| 6,051,446 | * | 4/2000 | Moore et al. .................. 438/36 |

OTHER PUBLICATIONS

Critchley, B. R., et al., "*Picture quality in large–screen projectors using the Digital Micromirror Device*", Journal of the SID, 3/4, pp. 199–202 (1995).

Colgan, E.G., et al., "*On–Chip Metallization Layers for Reflective Light Valves*", IBM J. Res. Develop. vol. 42, No. 3/4 May/Jul. 1998, pp. 339–345.

Takayama, S., et al., "*Effects of Y or Gd Addition on the Structures and Resistivities of Al Thin Films*", J. Vac. Sci. Technol. A 14(4), Jul./Aug. 1996, pp. 2499–2504.

Takayama, S., et al., "*Low resistivity Al–RE (RE=La, Pr, and MD) Alloy Thin Films with High Thermal Stability for Thin–Film–Transistor Interconnects*", J. Vac. Sci. Technol. B 14(5), Sep./Oct. 1996, pp. 3257–3262.

O'Hara, A., et al., "*Planarisation of Spatial Light Modulator Silicon Back–Planes Using Chemical–Mechanical Polishing*", 1994 The Institution of Electrical Engineers, publishes by IEE, Savoy Place, London WC2R OBL. UK, pp. 5/1–5/6.

Castleberry, D. E., et al., "*A 1 Mega–Pixel Color a–Si TFT Liquid–Crystal Display*", SID 88 Digest, First Ed., May 1987, ISSN 0097–966X, pp. 232–234.

Glueck, J., et al., "*Color–TV Projection with Fast–Switching Reflective HAN–Mode Light Valves*", SID 92 Digest, ISSN 0097–0966X, pp. 277280.

Cacharelis, P., et al., "*18.1: An 0.8–um EEPROM Technology Modified for a Reflective PDLC Light–Valve Application*", SID 97 Digest, pp. 289–292 (May 1997).

Sato, F., et al., "*L1.2: High Resolution and Bright LCD Projector with Reflective LCD Panels*", SID 97 Digest, pp. 997–1000 (1997).

Sugiura, N., et al., "*42.1: Designing Bright Reflective Full–color LCD's Using An Optimized Reflector*", SID 97 Digest, pp. 1011–1014, (1997).

* cited by examiner

SILICON INTERCONNECT PASSIVATION AND METALLIZATION PROCESS OPTIMIZED TO MAXIMIZE REFLECTANCE

CROSS-REFERENCE TO RELATED APPLICATION

The subject matter of this application is related to pending U.S. patent application Ser. No. 08/872,013, filed Jun. 9, 1997, entitled "REFLECTANCE ENHANCING THIN FILM STACK", inventor Paul M. Moore. The text of this related application is hereby incorporated by reference.

BACKGROUND OF THE INVENTION

1. Field of the Invention

The present invention relates to a method for forming a reflective metal surface and, in particular, to a silicon interconnect passivation and metallization process designed to maximize reflectance.

2. Description of the Related Art

Liquid crystal displays (LCDs) are becoming increasingly prevalent in high-density projection display devices. These conventional high density projection-type color display devices typically include a light source which emits white light. Dichroic mirrors separate the white light into its corresponding red, green and blue (RGB) bands of light. Each of these colored bands of light is then directed toward a corresponding liquid crystal light valve which, depending upon the image to be projected, either selectively permits or prevents transmission of light therethrough. Those RGB bands of light which are permitted to be transmitted through the light valves are then combined by dichroic mirrors or a prism. A projection lens then magnifies and projects the image onto a projection screen.

FIG. 1 illustrates a conventional LCD projection-type imaging system 100. Imaging system 100 includes a light source 101. White light is emitted from light source 101. Once the light hits the prism 103, the light is separated into its red, green and blue colored bands of light by dichroic filter coatings. Colored light is directed toward liquid crystal display (LCD) light valves 105. When reflected off light valve 105, the colored light waves travel back through the prism and through projection lens 107. Lens 107 magnifies and projects the synthesized color image onto projection screen 109.

FIG. 2 illustrates a cross-sectional view of adjacent pixel cell structures that form a portion of a conventional light valve. Portion 200 of the conventional light valve includes a glass top plate 202 bonded to an interconnect structure 204 by a sealing member (not shown). The sealing member serves to enclose a display area and to separate glass plate 202 from interconnect 204 by a predetermined minute distance. Thus, the light valve has an inner cavity 206 defined by the glass plate 202 and interconnect 204. Liquid crystal material 211, such as polymer dispersed liquid crystal (PDLC), is sealed in inner cavity 206.

In a reflective mode display technology, an image is generated by creating regions within the light valve having differing contrast. This contrast is created by the state of the liquid crystal material above the reflective surface, which in turn regulates the amount of light passing from the ambient to the reflective surface.

During operation of the light valve shown in FIG. 2, selective application of voltage to pixel electrodes 212a and 212b from underlying capacitor structures 218a and 218b through metallization 222 and 224 and via 240 switches pixel cells 210a and 210b on and off. Voltage applied to pixel electrodes 212a and 212b varies the direction of orientation of the liquid crystal material over the the pixel electrode. A change in the direction of orientation of the liquid crystal material at the pixel electrode changes the optical characteristics of the light traveling through the liquid crystal.

If the light valve contains twisted nematic crystal, light passes through the light valve unchanged where no voltage is applied to the pixel electrode, and the light is polarized if a voltage is applied to the pixel electrode. If the light valve contains PDLC, light passes through the light valve unchanged where a voltage is applied to the pixel electrode, and light is scattered if no voltage is applied to the pixel electrode.

One key attribute of light valve performance is the amount of light reflected by the pixel cell. The degree of reflectance of the pixel cell in turn affects other system attributes such as contrast ratio, pixel coherence and brightness efficiency. One approach to enhancing the performance of any reflective mode light valve is to increase the reflectance of the mirror toward the ideal.

In examining FIG. 2, it is apparent that pixel electrodes 212a and 212b will serve as the reflective surface of the light valve. Moreover, the highest (third) intermetal dielectric layer 228 serves as the substrate for the reflective pixel electrodes 212a and 212b. Therefore, the reflectance of the light value is dependent in large measure on the processing steps which follow formation of the highest intermetal dielectric layer 228 and all subsequent layers.

FIGS. 3A–3J illustrate cross-sectional views of the conventional processing steps affecting pixel cell reflectance during formation of adjacent pixel cell electrodes. FIG. 3A illustrates the formation of highest intermetal dielectric layer 328 upon lower metallization layer 324.

FIG. 3B illustrates leveling of the surface of the highest intermetal dielectric layer 328 using the process of planarization by SOG formation and etchback.

FIG. 3C illustrates the patterning of a photoresist mask 330 over the planarized surface of highest intermetal dielectric 328, followed by etching in unmasked areas to create vias 340.

FIG. 3D illustrates formation of a liner layer 342 within vias 340, followed by the formation of a layer of Tungsten 344 over the highest intermetal dielectric 328, filling vias 340.

FIG. 3E illustrates removal of tungsten layer 344 outside of the vias. This step can be accomplished by straight CMP, or alternatively by etchback followed by CMP.

FIG. 3F illustrates formation of the pixel adhesion underlayer 346, typically formed from Ti/TiN. This Ti/TiN layer 346 provides an adhesion surface for the AlCu and thereby prevents degradation of reflectance due to roughness occurring during subsequent thermal exposure. The potential contribution of the pixel adhesion layer to loss of reflectance is described in greater detail in Section 4 of the detailed description of the invention.

FIG. 3G shows formation of the pixel electrode layer 312 on top of pixel adhesion underlayer 346. Pixel electrode layer 312 is conventionally formed by depositing an Al/Cu mixture at approximately 400° C.

FIG. 3H illustrates patterning of a photoresist mask 350 on top of pixel electrode layer 312, followed by etching of unmasked regions of the pixel electrode layer and the pixel adhesion layer 346 to form discrete pixel electrodes 312a and 312b.

FIG. 3I illustrates removal of patterned photoresist mask 350 from the surface of pixel electrodes 312a and 312b to complete formation of reflective pixel electrodes 312a and 312b. Stripping of photoresist mask 350 is conventionally accomplished utilizing a 1) plasma ash, 2) solvent strip, and 3) plasma ash, sequence.

FIG. 3J illustrates formation of a passivation layer 352 on top of the reflective pixel electrodes 312a and 312b. This passivation layer 352 (typically silicon dioxide) is deposited at around 400° C. and protects the surface of the pixel electrodes 312a and 312b.

The conventional process flow depicted above in FIGS. 3A–3J enables creation of a reflective pixel cell. Unfortunately however, several steps of the conventional process inevitably degrade the reflectance of the pixel electrode.

First, the SOG planarization step shown in FIG. 3B generally does not result in an intermetal dielectric layer having a surface that is sufficiently smooth to promote optimum reflectance of the reflective pixel electrode layer to be formed above.

Therefore, there is a need in the art for a process flow that creates a highly smooth surface of the intermetal dielectric layer that will serve as the substrate for the reflective pixel electrode.

A second process step leading to diminished reflectance of the pixel cell is the etchback of tungsten outside of the vias as shown in FIG. 3E. Highest intermetal dielectric layer 328 forms the substrate for the pixel metal electrode. Roughness in the surface of Tungsten in this underlying layer can promote roughness and a loss of reflectance of the electrode formed above.

Therefore, there is a need in the art for a process flow that removes Tungsten outside of the via while creating a highly smooth surface in the Tungsten remaining within the via.

A third process step leading to diminished reflectance of the pixel cell is utilization of a pixel electrode adhesion layer composed of Ti/TiN as shown in FIG. 3F. The character of the adhesion layer inherently affects the roughness of the overlying AlCu.

Therefore, there is a need in the art for a process flow that decreases the roughness of the adhesion layer and also permits further suppression of hillock formation.

A fourth process step leading to diminished reflectance of the pixel cell is the high temperature deposition of the pixel electrode layer shown in FIG. 3G. Deposition of the metal pixel electrode at high temperatures (>200° C.) leads to formation of AlCu having large grain sizes. Large grains of AlCu naturally increase the roughness of the pixel electrode layer, thereby diminishing its reflectance.

Therefore, there is a need in the art for a process flow that produces a metal pixel electrode layer having sufficiently small grains to promote reflectance of the pixel electrode.

A fifth process step leading to diminished reflectance of the pixel cell is stripping of the photoresist mask utilized to etch the pixel electrode layer as shown in FIG. 3I. Exposure of the smooth freshly deposited surface of the pixel electrode layer to harsh conditions of the solvent strip and asher clean necessary to remove the photoresist increase roughness in the pixel electrode surface, diminishing its reflectance.

Therefore, there is a need in the art for a process flow that prevents roughening of the surface of the pixel electrode due to the removal of the photoresist mask used to etch the pixel electrodes.

A sixth process step leading to diminished reflectance of the pixel cell is deposition of the passivation layer at a temperature substantially different from the temperature at which the metal pixel electrode layer was originally formed. Such a large temperature difference between these steps can lead to the formation of hillocks in the metal surface. Such hillocks are generated by shear forces exerted on the metal layer due to the differing coefficients of thermal expansion of the metal pixel electrode layer and the overlying dielectric layer. The hillocks render the surface of the pixel cell uneven, and thereby degrade reflectance.

Therefore, there is a need in the art for a process flow that prevents the formation of hillocks in the pixel electrode layer upon the formation of the overlying passivation layer due to the difference in temperature of formation of these layers.

Roughness in the pixel electrode surface caused by processing can adversely affect reflectance. However, it is also possible to enhance the reflectance of a pixel cell beyond that of a bare metal electrode by forming a reflective-enhancing coating (REC) over the pixel cell electrode. U.S. patent application Ser. No. 08/872,013, entitled "REFLECTANCE ENHANCING THIN FILM STACK" describes utilization of a reflective coating consisting of thin films of dielectric materials that increase reflectance. The thin dielectric films accomplish this result by promoting constructive interference of incident light reflected by the pixel electrode.

Therefore, there is a need in the art for a process flow that leads to the formation of a REC over the surface of a pixel electrode.

SUMMARY OF THE INVENTION

The present invention relates to a process for forming a metal surface that is designed to maximize reflectance. Steps forming a part of a process in accordance with the present invention include 1) chemical mechanical polishing the underlying dielectric prior to forming the metal; 2) chemical mechanical polishing of the underlying dielectric following formation of vias; 3) forming a metal adhesion layer composed of collimated titanium over the underlying dielectric prior to the formation of the metal layer; 4) depositing metal at as low a temperature as feasible in order to maintain small grain size; 5) depositing at least the initial layer of a reflectance enhancing coating (REC) on top of the freshly deposited metal prior to etching the metal layer; and (6) depositing the initial layer of the reflectance enhancing coating at a temperature as close as possible to the temperature of formation of the metal electrode layer.

Depositing the REC serves two distinct purposes. First, the initial layer of REC coats the freshly deposited metal layer, preserving the metal in its highly reflective state. Second, the REC as a whole generates constructive interference of reflected light. This constructive interference can generate reflectivity greater than that of the bare metal surface.

A process of forming a reflective metal surface in accordance with a first embodiment of the present invention includes the steps of forming a highest intermetal dielectric layer on top of a highest layer of interconnect metallization, planarizing the highest intermetal dielectric, creating a via in the highest intermetal dielectric, lining the walls of the via with a liner layer, filling the via with an electrically conductive material, forming an electrode adhesion layer on top of the highest level intermetal dielectric and the via, forming an electrode layer on top of the electrode adhesion layer, and forming at least a first layer of a reflectance enhancing coating on top of the electrode layer prior to etching the electrode layer to define a plurality of discrete electrodes, with the reflectance enhancing coating generating constructive interference of light waves reflected by the electrode layer.

The features and advantages of the present invention will be understood upon consideration of the following detailed description of the invention and the accompanying drawings.

DETAILED DESCRIPTION OF THE INVENTION

Figure 1:
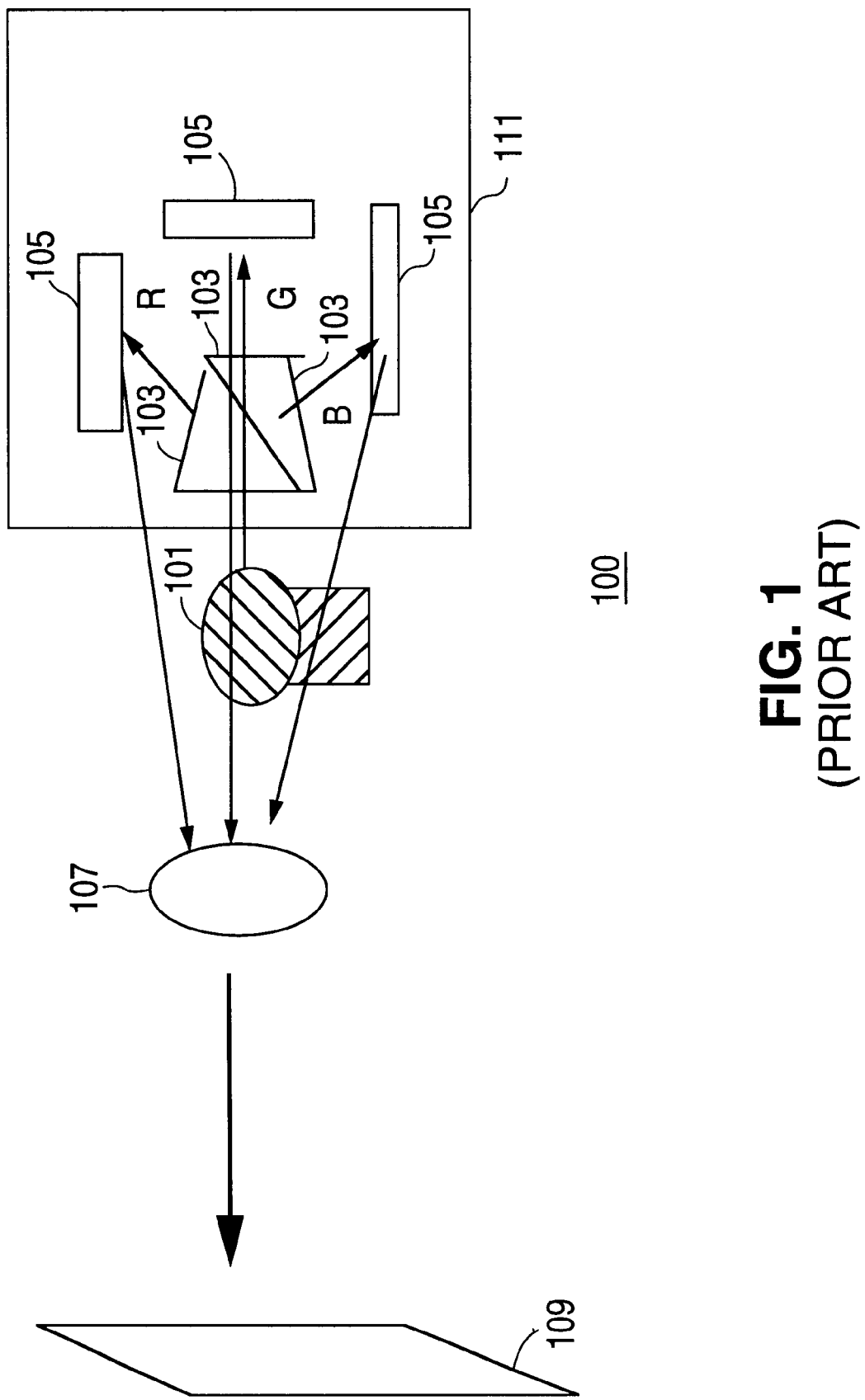
FIG. 1 illustrates a conventional LCD projection-type imaging system.

A process in accordance with the present invention combines a number of separate process steps designed to optimize the reflectance of a metal surface forming a pixel electrode. These steps are discussed below in the order of occurrence in the process flow.

1. Introduction

Ideally, the pixel electrode will obey the reflectivity given by Equation 1. In Equation 1 the reflection of light from the pixel electrode is dependent upon the electrode's material properties, quantified by the index of refraction. If the index of refraction were independent of the wavelength of the incident light, reflectivity would be constant versus wavelength. However, the index of refraction is a function of wavelength (i.e., dispersion) and produces reflectivity which is dependent upon wavelength. Therefore, Equation 1 approximates the reflectance as a function of inherent material properties with which variation is limited to dispersion and the material sample.

$$\rho = \frac{[(\eta_{AlCu} - \eta_{external})^2 + K_{AlCu}^2]}{[(\eta_{AlCu} + \eta_{external})^2 + K_{AlCu}^2]} \tag{1}$$

In practice, fabrication of the pixel cell does not provide the ideal reflectivity given by Equation (1). Instead, roughness in the pixel electrode will attenuate the measured reflectance as a function of wavelength. Equation 2 provides a general attenuation function for an illuminating source projected normal to the surface.

$$r = r_{ideal}\tilde{\omega}\left[-\frac{4\pi}{\lambda}\right] \tag{2}$$

Where the reflectance given by Equation (2) is multiplied by its complex conjugate, the omega-tilde function indicates the Fourier transform of the interface profile. The profile is the manner in which one medium transitions into an adjoining medium. Any number of interface functions may be placed in Equation (2). When the interface transition is given by the error function, the reflectance becomes:

$$\rho = \frac{[(\eta_{AlCu} - \eta_{external})^2 + K_{AlCu}^2]}{[\eta_{AlCu} + \eta_{external})^2 + K_{AlCu}^2]} \exp\left[-\left(\frac{4\pi\sigma}{\lambda}\right)^2\right] \quad (3a)$$

where sigma is the interface thickness or root-mean-squared (RMS) roughness, depending upon one's interpretation of the surface being deterministic or random.

Observed reflectance is actually a combination of specular and scattered reflectance. The amount of the total observed reflectance is dependent upon the size of the instrument's objective. Therefore, the reflectance is truly:

$$\rho = \rho_{specular} + \rho_{scattered} \quad (3b)$$

$$\rho_{scattered} = \quad (3c)$$
$$\frac{[(\eta_{AlCu} - \eta_{external})^2 + K_{AlCu}^2]}{[\eta_{AlCu} + \eta_{external})^2 + K_{AlCu}^2]}\left[1 - \exp\left[\left(\frac{4\pi\sigma}{\lambda}\right)^2\right]\right]\left[1 - \exp\left[-\left(\frac{\pi\alpha\delta}{\lambda}\right)^2\right]\right]$$

where $\alpha$ is the objective's half angle and $\delta$ is the correlation distance between interface features. With assumption that the product $\alpha \times \delta$ is much smaller than the wavelength of light, we may neglect this term from (3a). However, this simplification may provide a source of error for estimations.

2. Roughness of Highest Intermetal Dielectric

As discussed above in connection with FIG. 3B, the first processing step that can degrade reflectivity in the pixel electrode is the formation of the highest intermetal dielectric layer underlying the pixel electrode. SOG planarization of the highest intermetal dielectric after formation creates a substrate having less than adequate smoothness.

To correct this problem, the present invention adds a CMP immediately following conventional SOG planarization. The thickness of the highest intermetal dielectric layer is increased to compensate for the bulk removal of dielectric material required to planarize the surface by CMP.

The additional CMP step provides a two-fold benefit to the pixel reflectance. First, the CMP reduces the topology created by the underlying circuitry and interconnect structures. This topology is on the order of $1 \times 10^3$ Å.

The second advantage of CMP after SOG planarization is reduction in the root mean square ("RMS") roughness of the highest level of intermetal dielectric is reduced. This RMS roughness is on the order of $1 \times 10^1 - 1 \times 10^2$ Å.

Figure 4:
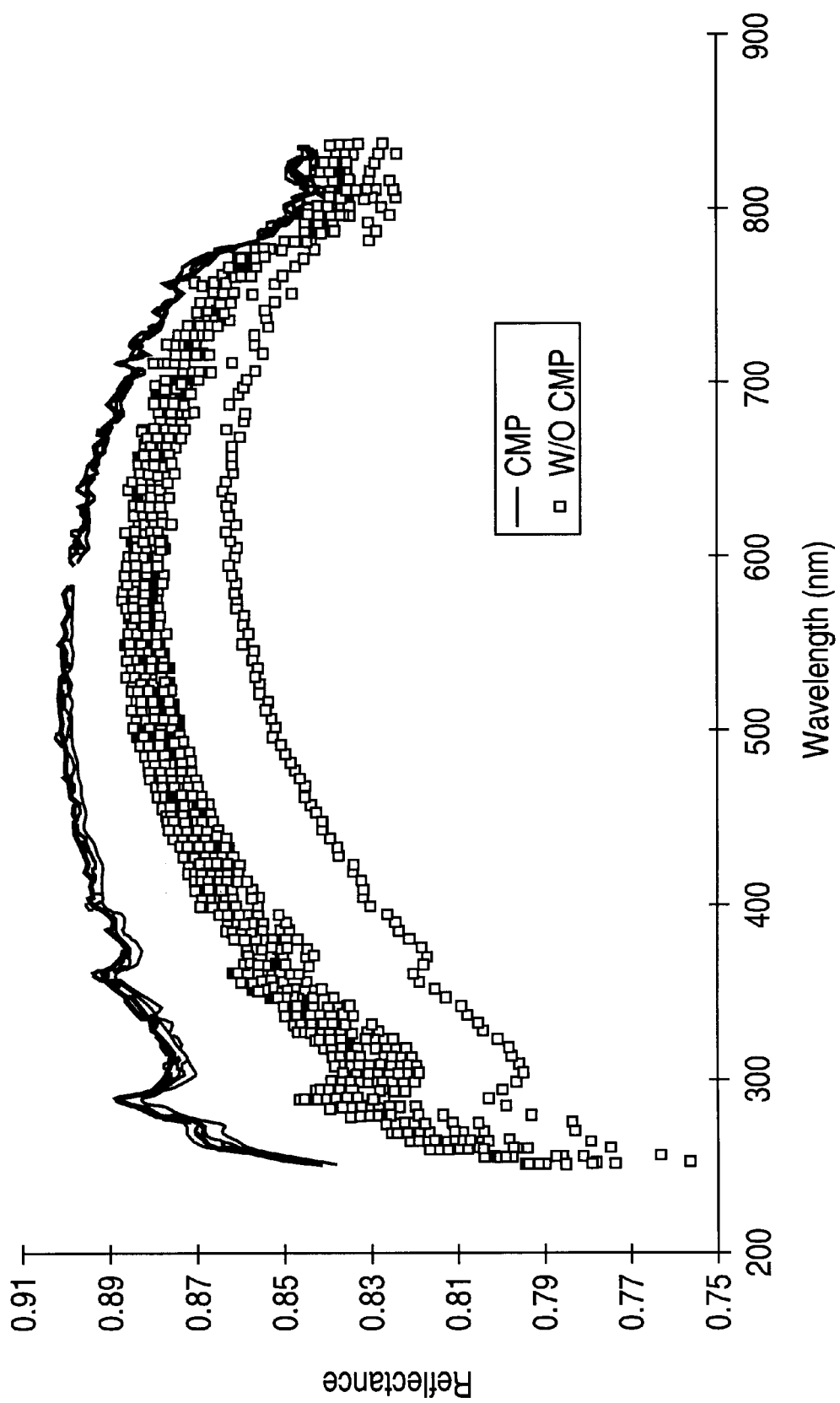
FIG. 4 shows reflectance as measured by two sets of wafers, one set including SOG planarization only, the other set including both SOG planarization followed by chemical mechanical polishing.

FIG. 4 shows reflectance as measured by two sets of wafers, one set including SOG planarization only, the other set including both SOG planarization and the chemical mechanical polishing step disclosed in accordance with the present invention. The data plotted in FIG. 4 was taken from an area of the wafer which was free of any device or interconnect related topology. In this manner, any degradation in reflectance due to the randomly induced roughness was isolated from the systematic interconnect topography.

By chemical mechanical polishing the surface of the highest intermetal dielectric, surface roughness of the pixel layer deposited upon the intermetal dielectric was reduced by approximately 67 Å. This 67 Å figure was obtained by the following approximation.

For two separate surfaces with uniquely individual surface roughness, but composed of the same material, the ratio of the individual reflectance given by Equation 3a may be algebraically manipulated to reveal:

$$(\sigma_1 - \sigma_2) = \sqrt{-\ln\left(\frac{\rho_1}{\rho_2}\right) \cdot \left(\frac{4\pi}{\lambda}\right)^{-2}} \quad (4)$$

Substituting the reflectance of a given surface to the average observed reflectance of FIG. 4 yields the difference in average surface roughness of Equation (4) to be 67 Å. This is thus the average difference in roughness between the CMP and no/CMP wafers shown in FIG. 4.

Figure 5:
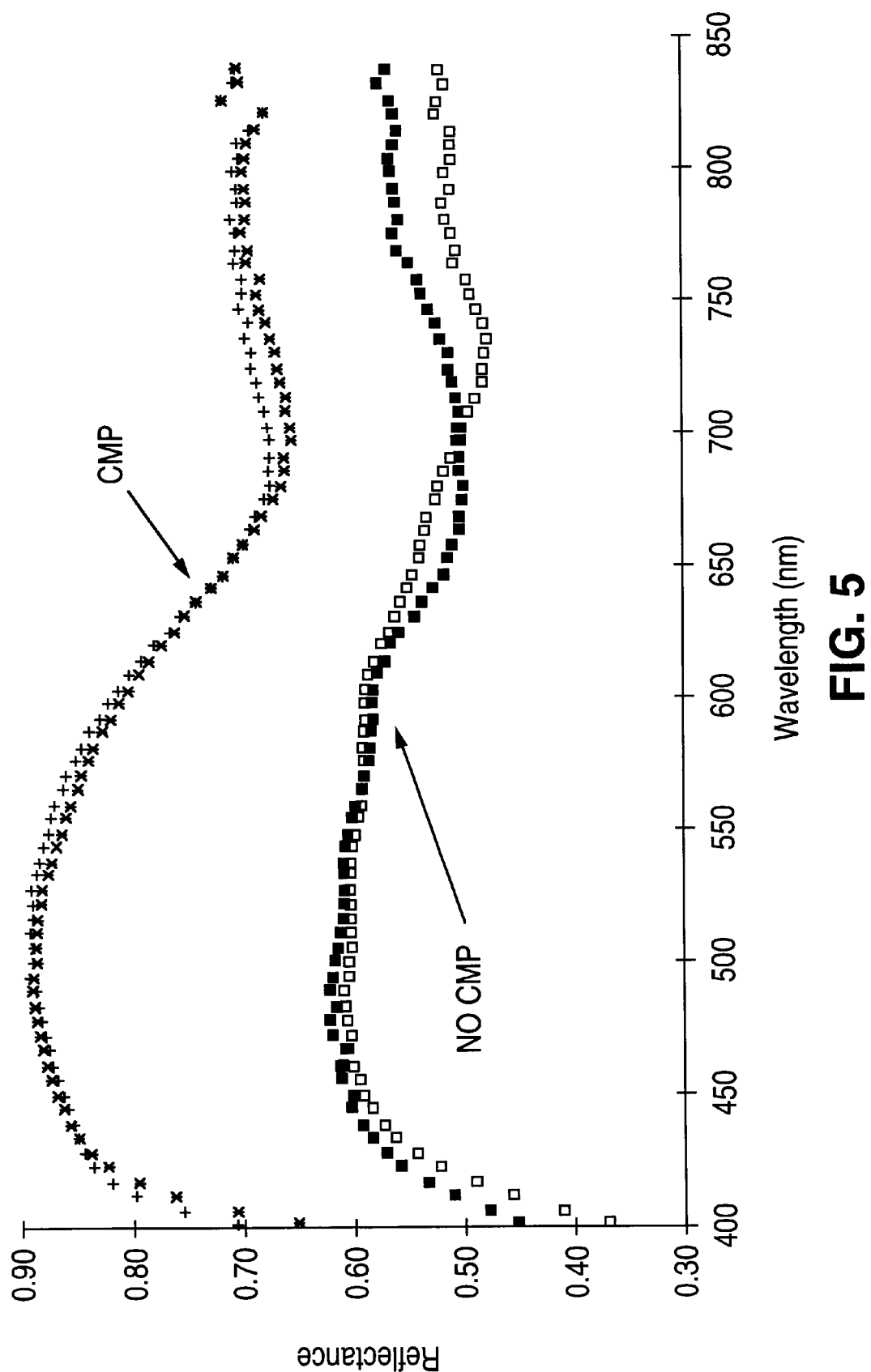
FIG. 5 plots reflectance of two lots of wafers with and without the CMP step.

FIG. 5 also plots reflectance of two lots of wafers with and without the additional CMP step. The reflectance data of FIG. 5 was collected by centering a ten micrometer spot light over a single twelve micrometer pixel. FIG. 5 shows that absent CMP, the measured reflectance decreased by thirty percent.

3. Roughness of Via Liner

Figure 3A:
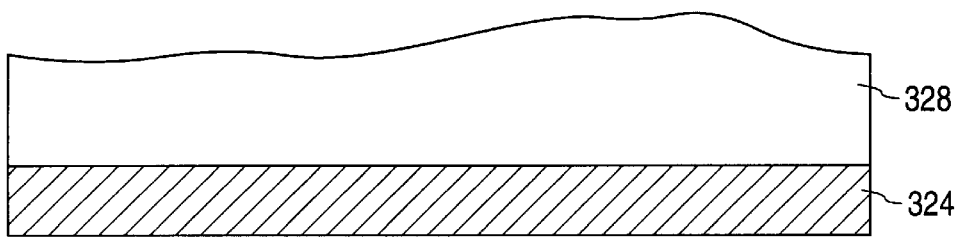
FIGS. 3A–3J illustrate cross-sectional views of the conventional processing steps affecting pixel cell reflectance during formation of adjacent pixel cell electrodes.
Figure 3B:
Figure 3C:
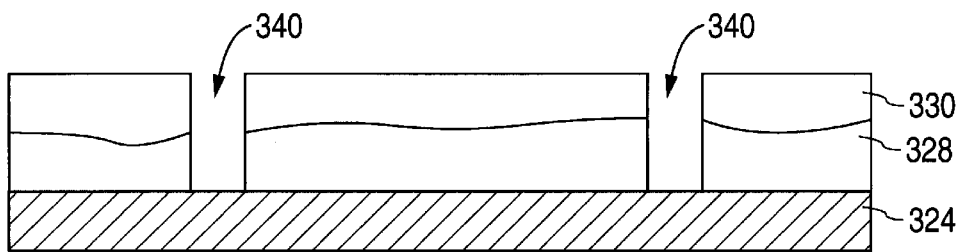
Figure 3D:
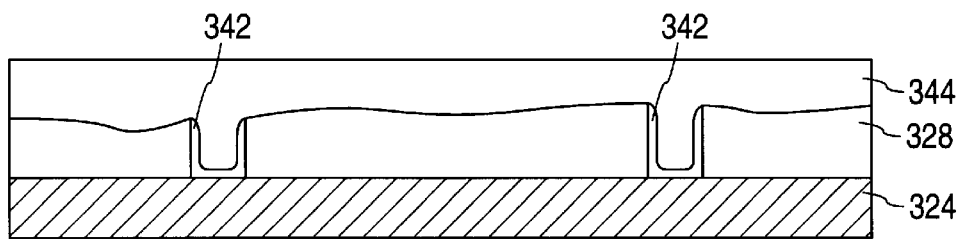
Figure 3E:

As shown in prior FIGS. 3C–3E, following formation and planarization of the highest intermetal dielectric layer, the pixel cell fabrication process continues with the steps of etching the highest dielectric layer to form vias to the underlying lower interconnect metallization layer. Titanium and titanium nitride are then deposited to serve as a via liner layer. Tungsten is then deposited to fill the via, and then the tungsten is removed outside of the via either by straight CMP or by a combination of etchback and CMP.

The surface roughness of the reflective pixel electrode is dependent not only upon smoothness of the underlying substrate, but also upon grain formation of AlCu in the metal layer. Thus, the underlying titanium nitride must be smooth compared to the surface formed by the AlCu grains, or roughness of the underlying substrate will be the determining factor of the reflectance of the pixel electrode.

Figure 6:
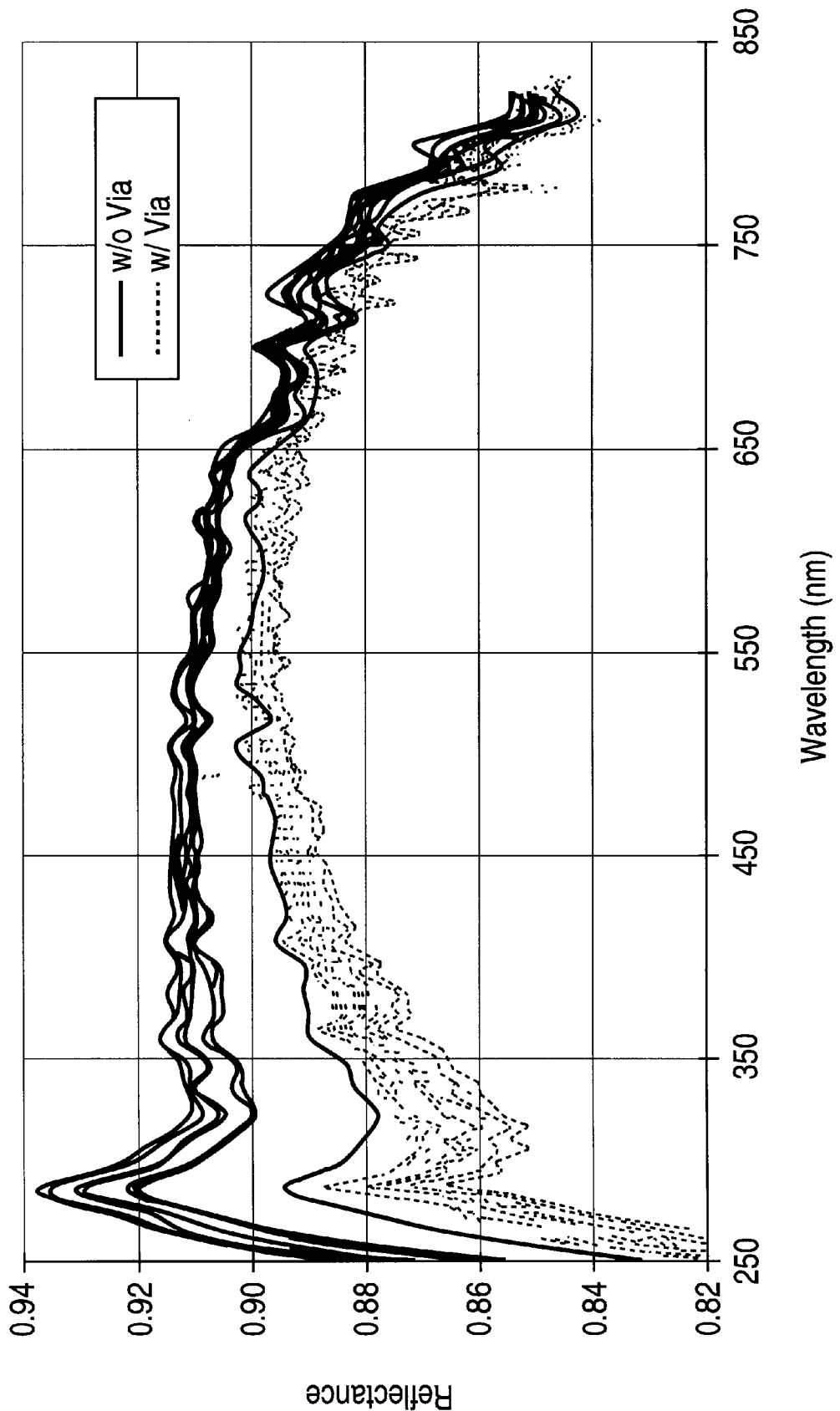
FIG. 6 plots reflectance of pixels with and without via processing.

FIG. 6 compares the highest measured reflectance at a pixel corner for pixels with and without via processing.

In each data point of FIG. 6, reflectance was measured on a portion of the wafer which had no vias, the "field". Measuring the field reflectance on wafers with and without vias enabled isolation of the processes which had the greatest effect on the surface roughness of the pixel electrode layer.

Figure 7:
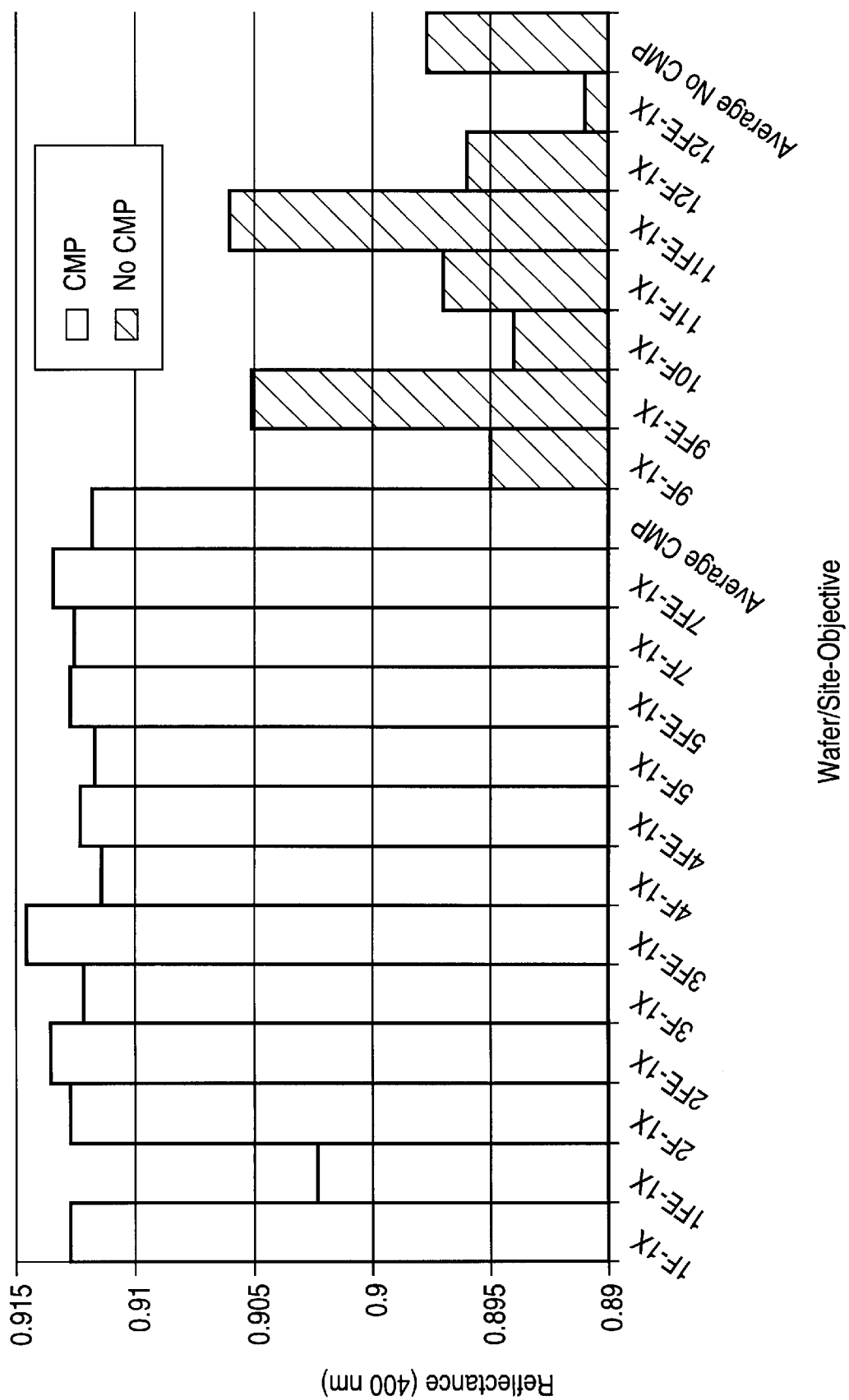
FIG. 7 plots the reflectance of wafers with and without the additional CMP touch-up step following Tungsten etchback.

Because tungsten etch-back was identified as the a source of roughness in the pixel electrode surface, a CMP touch-up step following tungsten etch-back was performed. FIG. 7 compares the reflectance of wafers with and without the additional CMP touch-up step following tungsten etchback.

FIG. 7 consistently reveals that wafers including CMP touch-up after tungsten etch back possessed higher reflectance than wafers lacking this additional processing step. Specifically, the touch-up CMP increased the reflectance of the AlCu surface at the low wavelengths. Such a reflectance increase is due to a decrease of in scattered light relative to specular light, and indicates a roughness reduction. Thus, the benefits of cold AlCu sputtering are not realized unless a touch-up CMP step following tungsten removal is employed. FIG. 7 also indicates less variance in the reflectance of multiple wafers having the CMP touch-up step.

Figure 8:
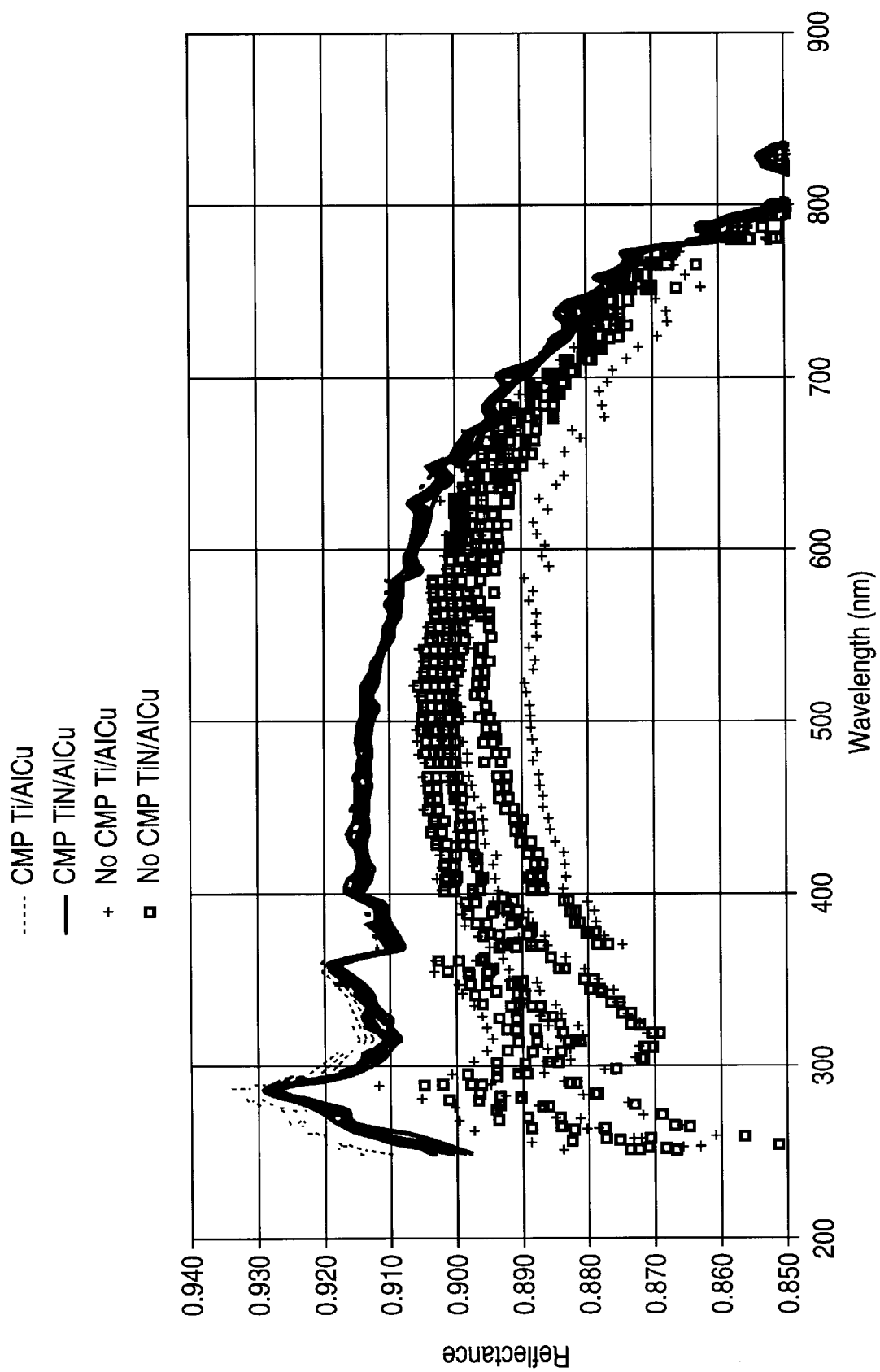
FIG. 8 plots the effect of touch-up CMP upon reflectance of a pixel electrode layer deposited over a pixel adhesion layer composed of either TIN or collimated Ti, for lots of wafers including and omitting CMP processing.

FIG. 8 shows reflectance of a 5000 Å pixel electrode layer deposited at 50° C. over a pixel adhesion layer composed of either TiN or collimated Ti, with and without CMP of tungsten vias following etchback.

Ti/AlCu wafers including CMP (indicated by the dashed line) evidenced consistently higher reflectance than otherwise identical wafers not subjected to the CMP (indicated by the pluses "+"). Similarly, TiN/AlCu wafers including CMP (indicated by the solid line) evidenced consistently higher reflectance than otherwise identical wafers not subjected to the CMP (indicated by the squares "□")

In reviewing FIG. 8, it is important to notice the increase in the reflectance and the small variance of distribution over a single wavelength, of wafers subjected to the touch-up CMP versus the wafers which where not polished.

4. Roughness of Pixel Adhesion Layer

Figure 3F:
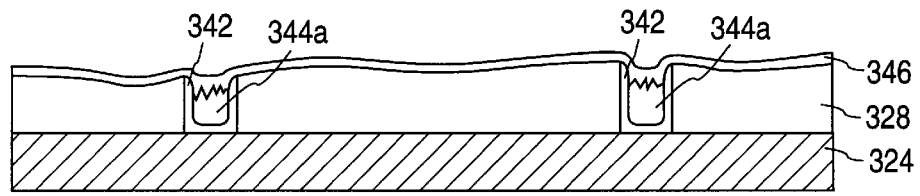
Figure 3G:
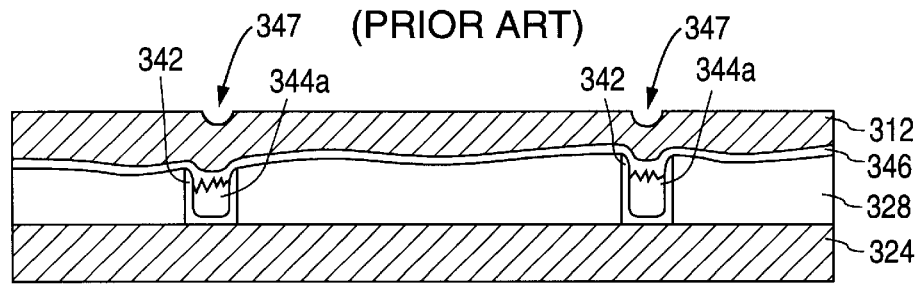

As discussed above in connection with FIG. 3F, formation of the pixel adhesion layer can affect the reflectance of the pixel electrode layer. This is also shown graphically in FIG. 8.

Wafers subjected to CMP utilizing a collimated Ti adhesion layer (indicated by the dashed line) evidenced slightly greater reflectance than otherwise identical wafers utilizing a TiN adhesion layer (indicated by the solid line). Similarly, wafers not subjected to CMP utilizing a collimated Ti adhesion layer (indicated by the pluses "+") evidenced slightly greater reflectance than otherwise identical wafers utilizing a TiN adhesion layer (indicated by the squares "□").

Here, it is interesting to note that while the overall reflectance difference attributable to the adhesion layer was relatively minor, the difference was especially pronounced 1) at low wavelengths, and 2) where CMP following W etchback was employed.

5. Deposition of Pixel Electrode Layer

A. Effect of Temperature

The AlCu metal layer making up the pixel electrode is typically formed on top of the adhesion layer utilizing sputter deposition techniques. The grain size of the deposited Al/Cu can vary according to the temperature at the time of deposition. Deposition of the metal at higher temperatures generally leads to the formation of larger grains. These larger metal grains render the metal surface more rough, and decrease reflectance.

Figure 9:
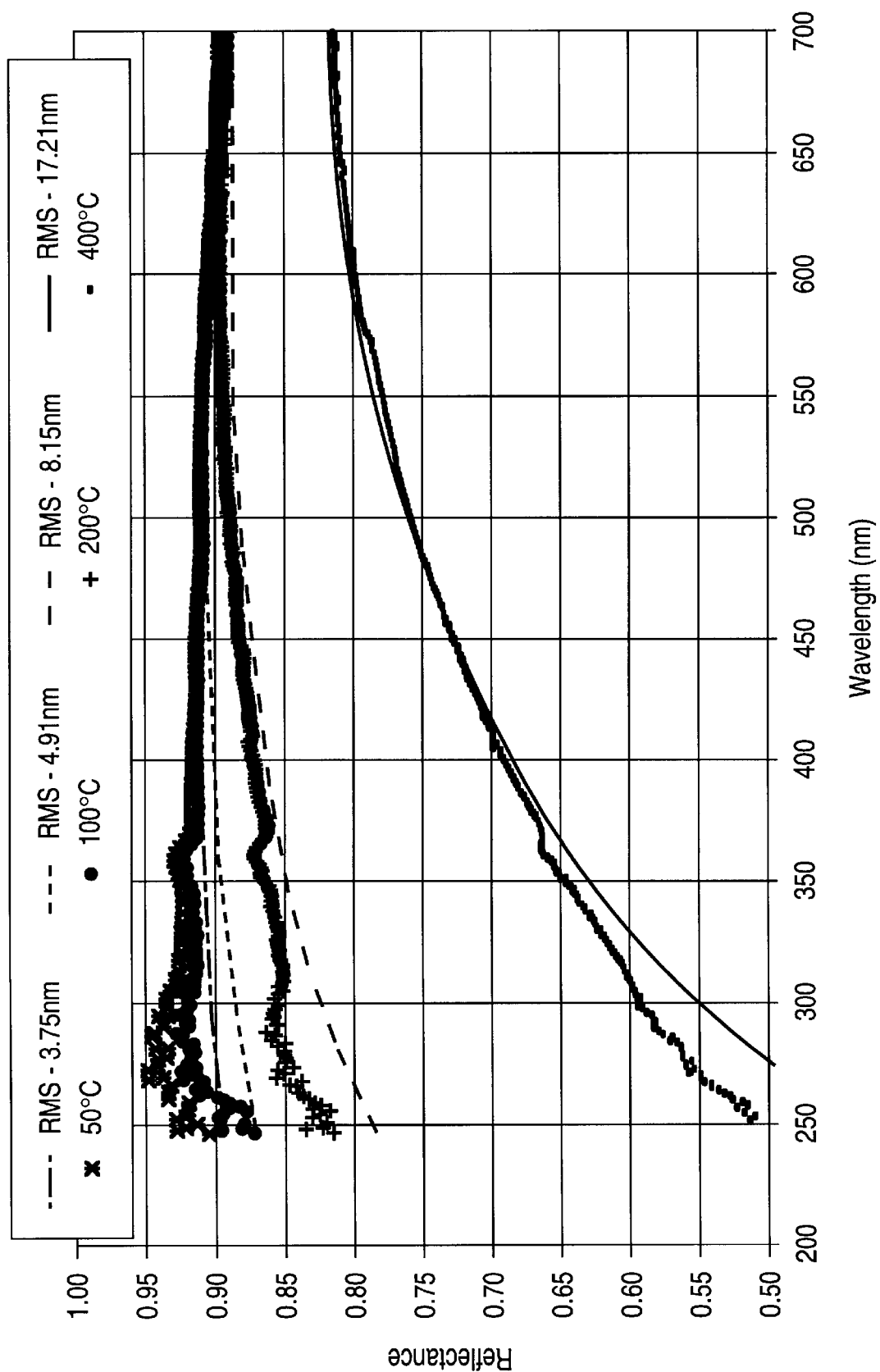
FIG. 9 plots observed and predicted reflectance for a pixel electrode layer of 99.5%/0.5% Al/Cu sputter deposited at four different temperatures.

FIG. 9 depicts observed reflectance data for an AlCu (99.5%/0.5% wt.) mixture sputter deposited at four different temperatures. FIG. 9 also plots the predicted reflectance as derived by root-mean-squared (RMS) roughness data measured by an atomic force microscope (AFM) and input into Equation (3a).

In reviewing FIG. 9, it is important to note that for both observed and predicted reflectance, temperature of AlCu deposition is inversely proportional to reflectance. This relationship is likely attributable to the grain size of the AlCu formed, where higher temperature deposition leads to the formation of larger grains and greater surface roughness. Reducing grain size and surface roughness is thus clearly a major goal in preserving the theoretical absolute maximum reflectivity. Ideally, maximum reflectance would be attained by sputtering AlCu at 50° C.

Figure 10B:
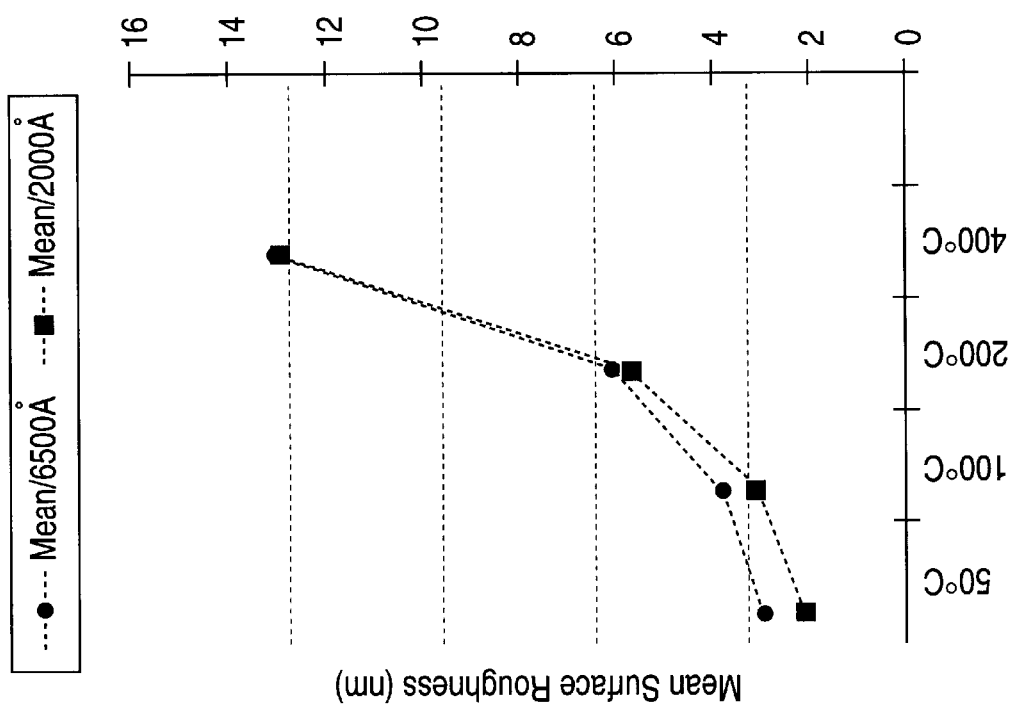
FIGS. 10A–10C plot metal deposition temperature versus grain size, mean surface roughness, and reflectance for AlCu metal layers having thicknesses of 6500 Å and 2000 Å.
Figure 10A:
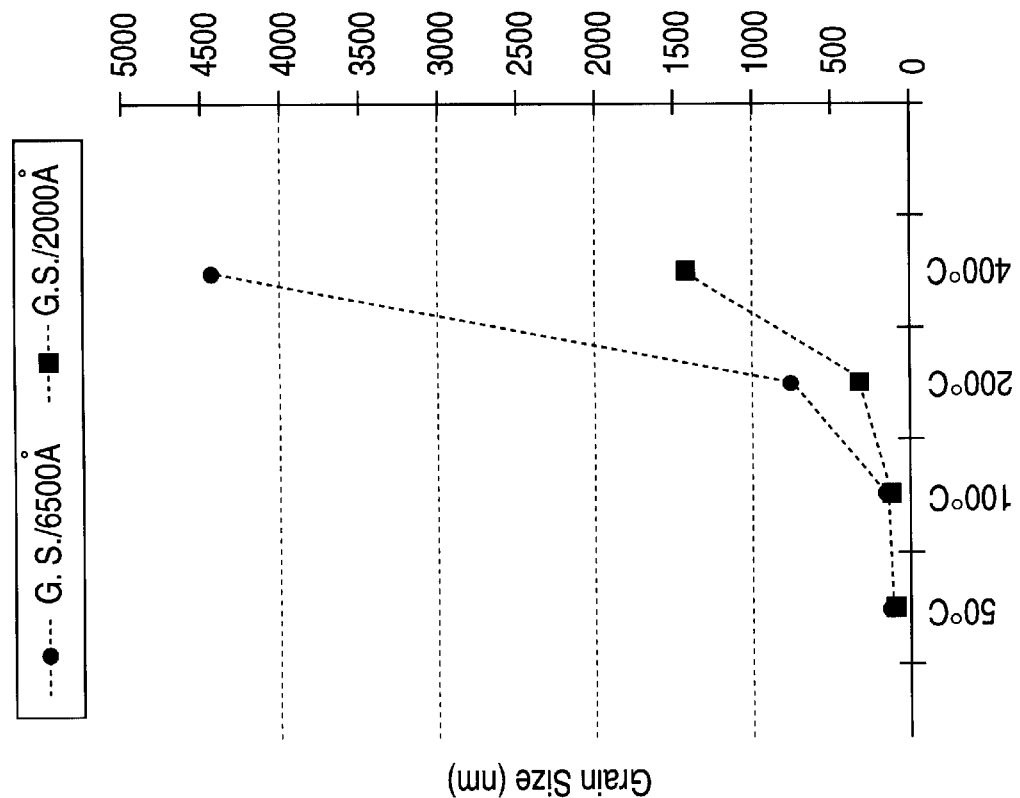
Figure 10C:
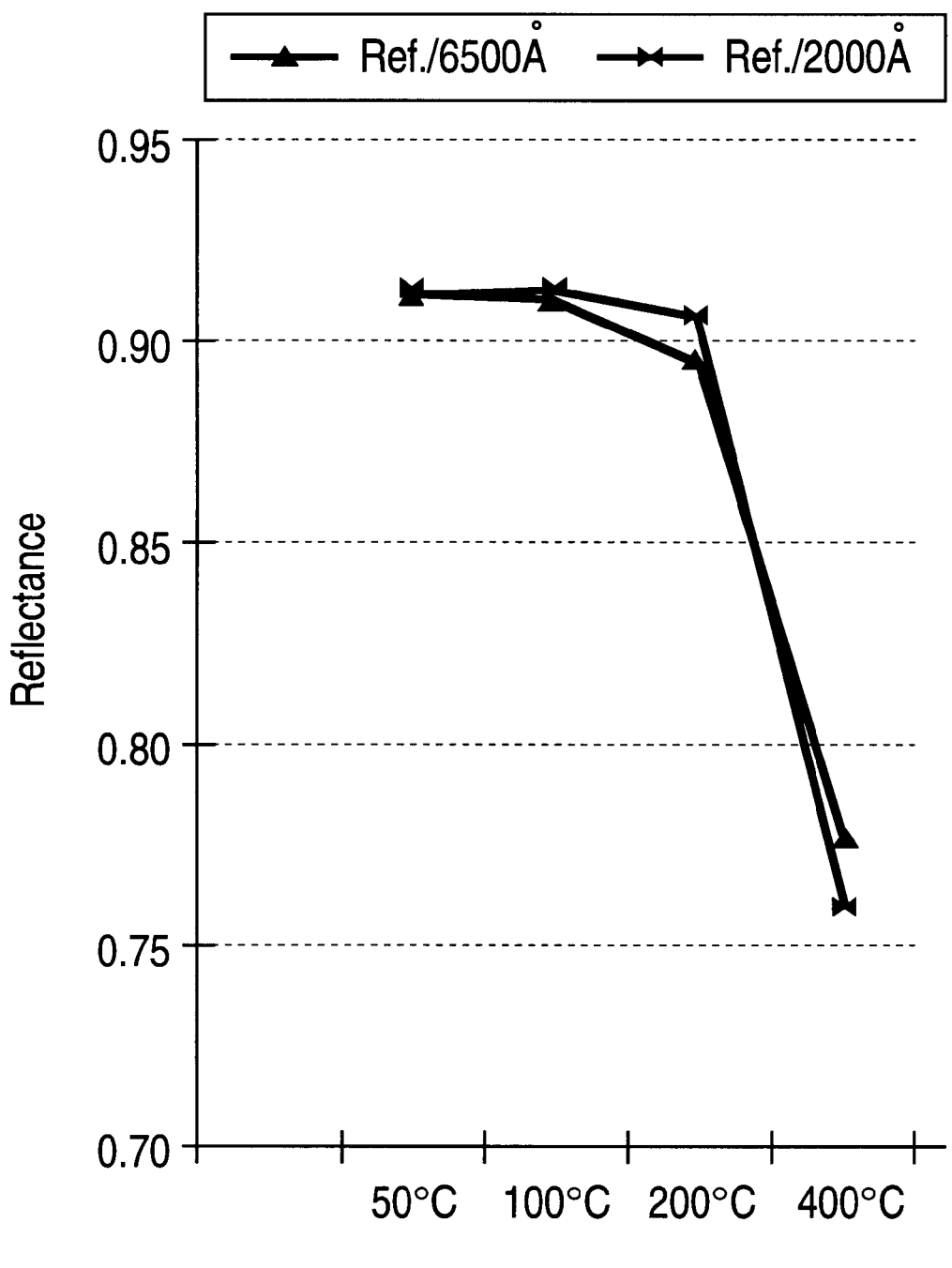

The relationship between metal deposition temperature and grain size, roughness, and reflectance is further illustrated in FIGS. 10A–10C.

FIG. 10A plots metal deposition temperature versus grain size for 6500 Å thick and 2000 Å thick AlCu layers. FIG. 10B plots metal deposition temperature versus mean surface roughness for the 6500 Å thick and the 2000 Å thick AlCu layers. FIG. 10C plots metal deposition temperature versus reflectance for the 2000 Å thick and the 6500 Å thick AlCu layers.

Comparison of FIGS. 10A–10C reveals that as the temperature of metal deposition increases from 50° c. to 400° c., grain size also increases from <200 mm to approximately 4500 mm for the 6500 Å layer, and to approximately 1500 mm for the 2000 Å layer. This dramatic increase in grain size of the deposited metal results in increased surface roughness and decreased reflectance FIGS. 9 and 10A–10C indicate the desirability of depositing the metal forming the pixel electrode layer at as low a temperature as possible. Metal deposition at a low temperature ensures that the grain size of the deposited metal remains small, and the reflectance high.

Finally, it is interesting to note that little difference in roughness was observed between films deposited at 50° C. versus 100° C., where collimated Ti was employed as the underlying adhesion layer instead of TiN.

B. Effect of Metal Thickness

The thickness of the metal layer deposited to form the pixel cell electrode also affects reflectance. Referring again to prior FIGS. 10A–10C, comparison of these FIGS. reveals that for each temperature of metal deposition, as metal thickness increases so does grain size and mean surface roughness. These changes in turn produce a decline in reflectance.

Figure 11:
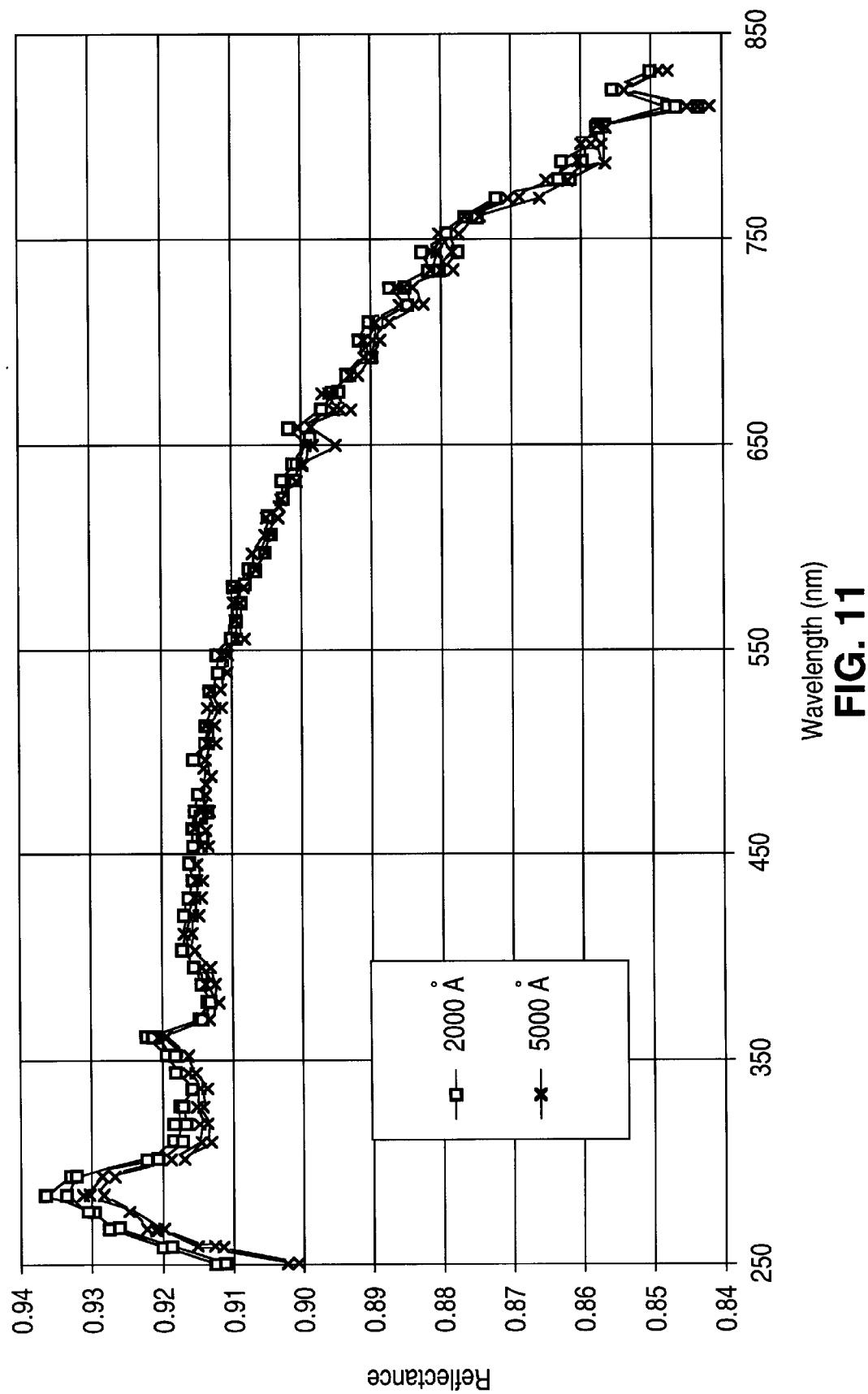
FIG. 11 plots reflectance as deposited for AlCu layers having thicknesses of 5000 Å and 2000 Å.

FIG. 11 also shows the variation in reflectance for a pixel electrode layers of varying thickness, in this case AlCu layers having thicknesses of 2000 Å and 5000 Å. Focusing upon the lower region of the spectrum, it is apparent that the 2000 Å metal layer has slightly greater reflectance.

6. Etching of Pixel Electrode Layer

Figure 3H:
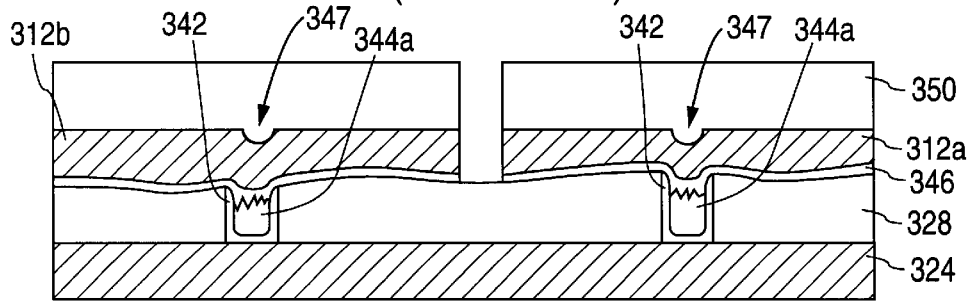
Figure 3I:
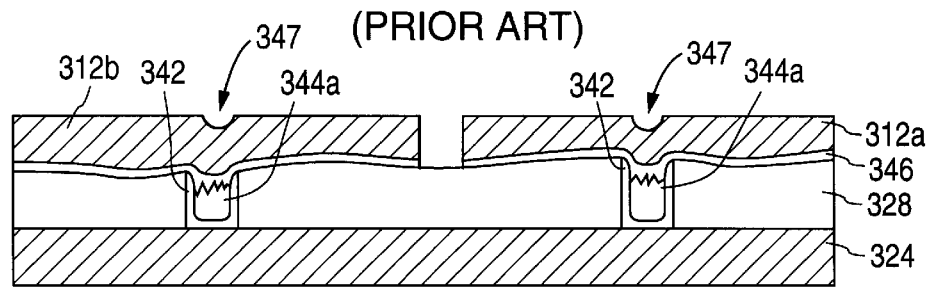

As shown in prior FIG. 3H, after forming the reflective pixel electrode layer on top of the highest intermetal dielectric layer, the next step is to etch the reflective pixel layer to define the discrete electrodes of individual pixel cells.

Following masking and etching of the reflective pixel electrode layer, three process steps are executed to remove the photo resist: 1) first plasma ash; 2) solvent strip; and 3) second plasma ash. As these processes occur after deposition of the smooth pixel electrode layer, they subject the surface of the pixel electrode layer to roughening and a corresponding loss of reflectance.

Figure 12:
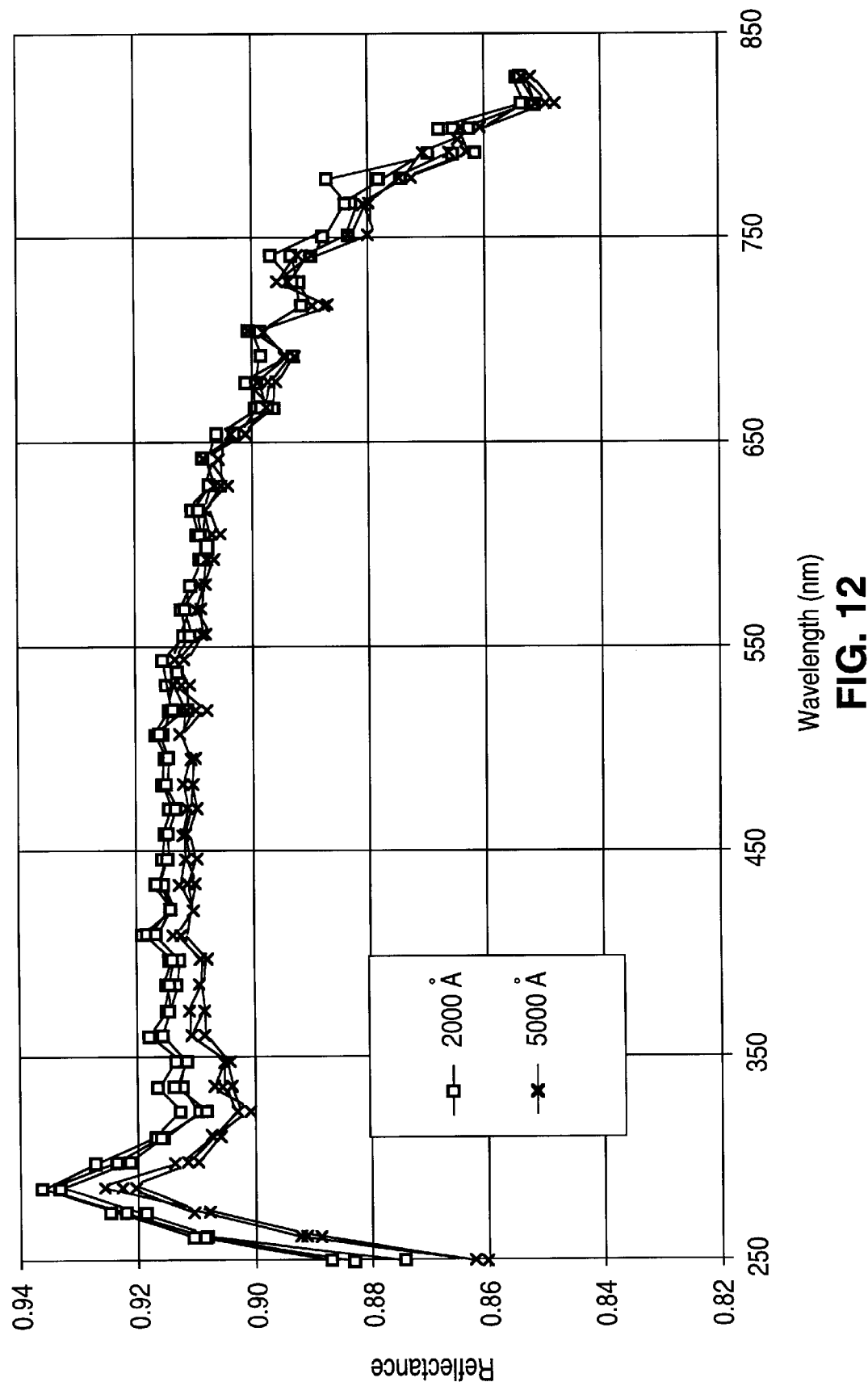
FIG. 12 plots reflectance for the 5000 Å and 2000 Å AlCu layers of FIG. 13 following the first plasma ash step and the solvent strip step.
Figure 13:
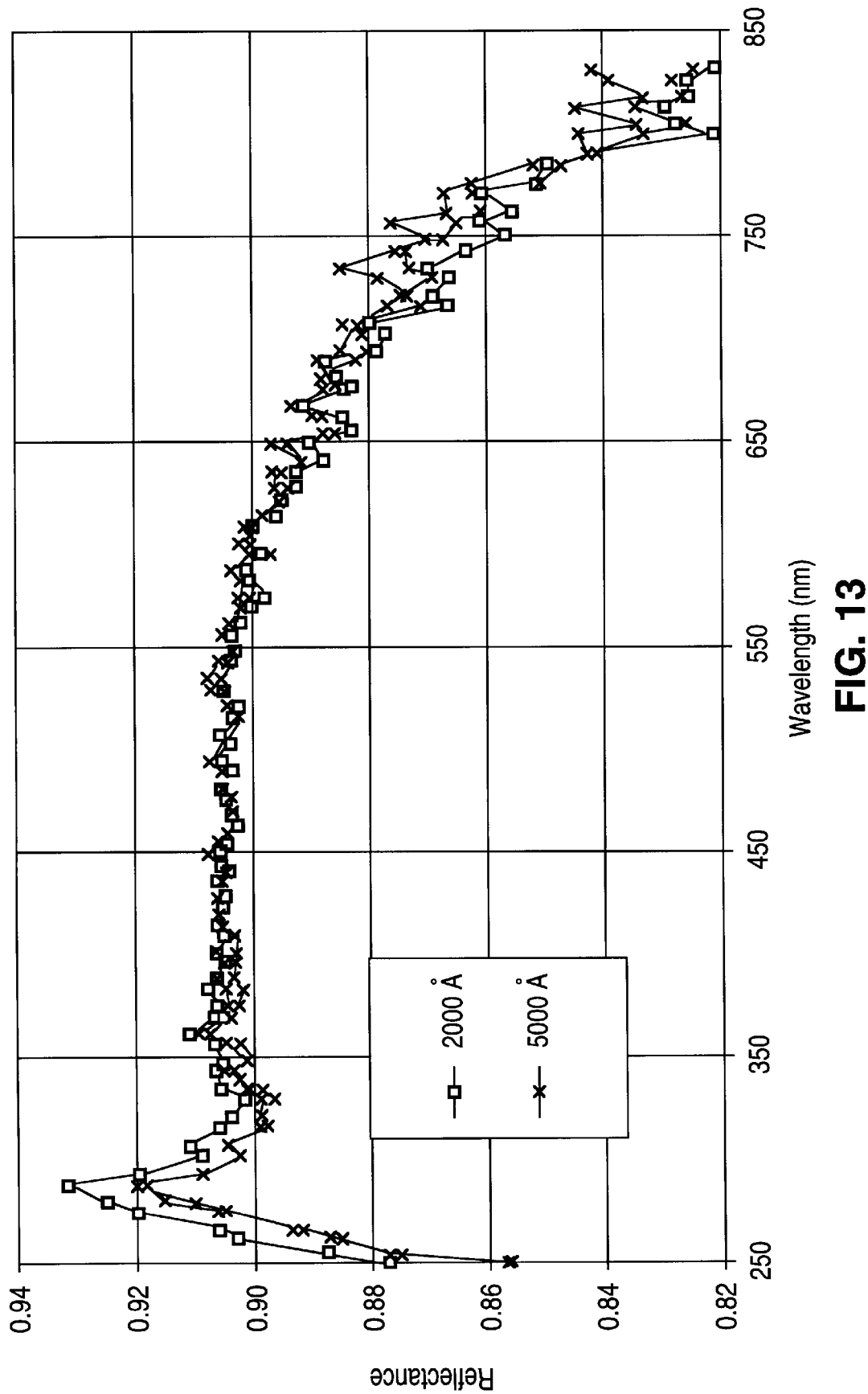
FIG. 13 plots reflectance for the 5000 Å and 2000 Å AlCu layers of FIG. 14 following the second plasma ash step.

The harmful effect of photoresist stripping upon the reflectivity of the pixel electrode is shown by FIGS. 12 and 13. FIG. 12 shows the reflectance of the 2000 Å and 5000 Å metal layers of FIG. 11, following the first plasma ash step and the solvent strip step. For FIG. 12, it is interesting to note that the dependence between reflectance and metal thickness becomes greater than as shown in FIG. 11.

FIG. 13 shows the reflectance of the 2000 Å and 5000 Å metal layers depicted in FIGS. 12 and 13 following the second plasma ash step. For FIG. 13, it is interesting to note that the dependence between reflectance and metal thickness is less pronounced after the second plasma ash. This suggests that the increased roughness of the pixel electrode layer is driven by exposure of that surface to the plasma ash process.

The above discussion indicates that the final plasma ash step significantly degrades the reflectance of the underlying metal pixel electrode layer. In order to avoid this degradation, this invention forms the REC prior to etching the pixel electrode layer. Detailed discussion of the REC and its formation is given below.

7. REC Formation

A. Introduction

While the reflectance of AlCu will benefit from as little roughness as possible, the maximum reflectance of the pixel electrode layer will generally be less than the elusive 100%. Therefore, other means of increasing reflectance must be employed.

Figure 3J:
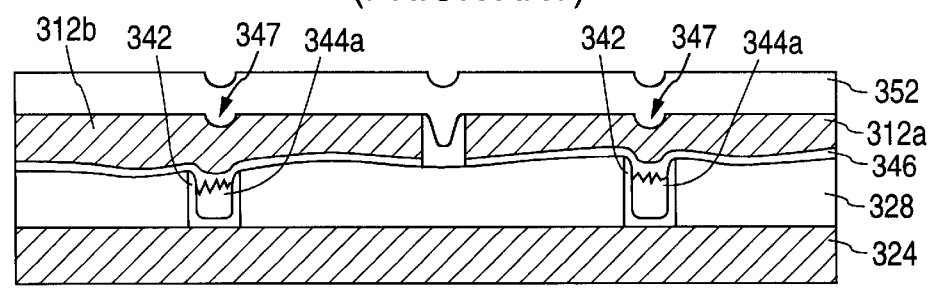

As shown in FIG. 3J, a passive layer of dielectric is normally added following etching to protect the silicon circuitry from the external environment. However, as described in co-pending patent application Ser. No. 08/872,013, this passivation component can also be designed to generate constructive interference.

Such constructive interference is achieved by layering dielectrics of differing indices of refraction on top of the pixel electrode layer. Interference between reflections at each interface of the passivating dielectric layers combine to exceed the reflectance of the individual films.

Figure 14:
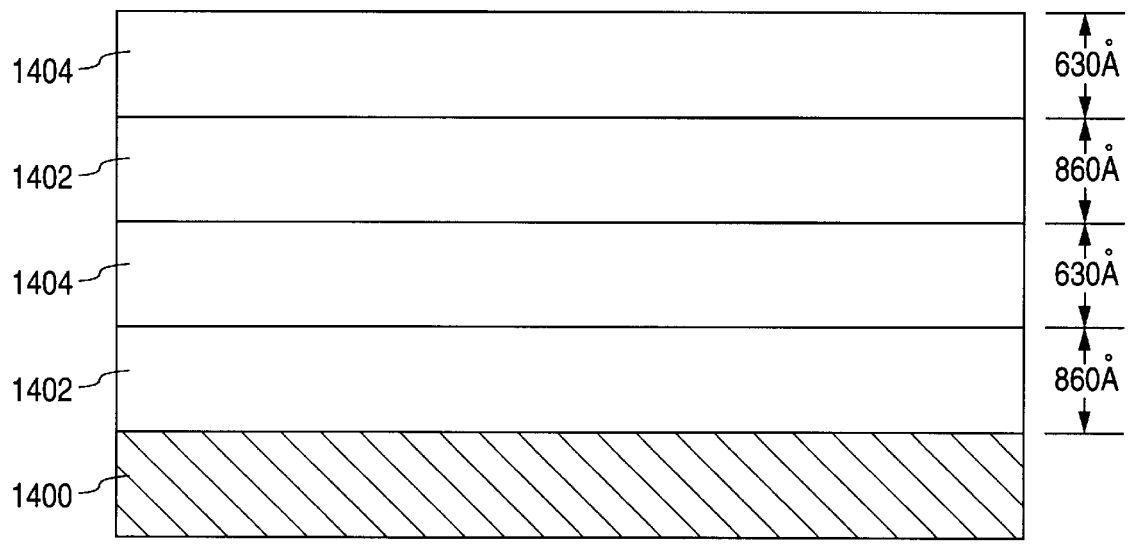
FIG. 14 illustrates a cross-sectional view of a four layer REC produced by the pixels in accordance with a first embodiment of the present invention.

FIG. 14 illustrates a cross-section of the pixel electrode layer 1400 bearing a REC comprising alternating layers of $SiO_2$ 1402 and $Si_3N_4$ 1404. $SiO_2$ layers 1402 have a thickness of approximately 860 Å. $Si_3N_4$ layers 1404 have a thickness of approximately 630 Å. This embodiment of the REC has two beneficial aspects. First, both $SiO_2$ and $Si_3N_4$ are commonly used as passivation layers. Second, plasma enhanced chemical vapor deposition (PECVD) is a commonly employed low temperature processing method. As discussed in detail below in Section 6, low temperature deposition of REC is of paramount importance in retaining the optimal reflectance from the AlCu surface.

Figure 15:
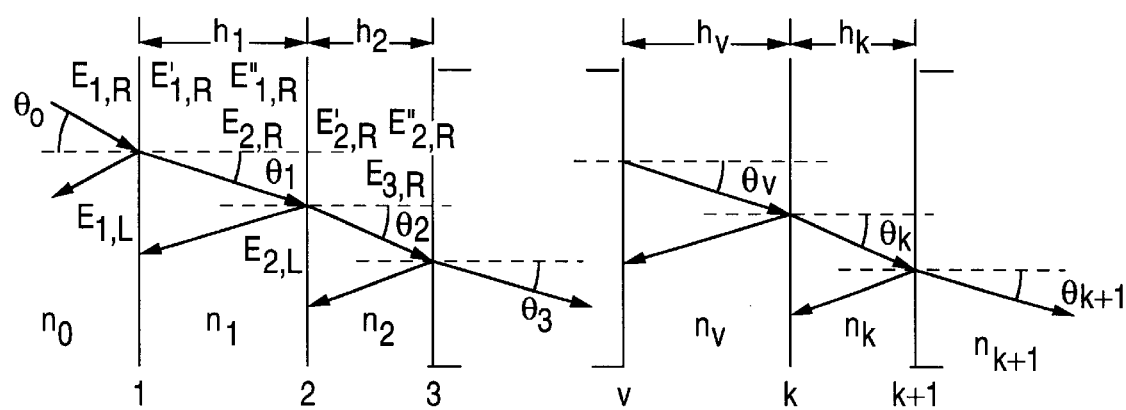
FIG. 15 shows a simple reflection diagram of the REC shown in FIG. 14.

FIG. 15 shows a simple reflection diagram of the REC. After selecting the composition of the various layers of the REC, the remaining design parameter is thickness respective to each film. As example, one may select the optical or phase thickness (n*d) to be one quarter of the mid-band wavelength of light at 550 nm. One quarter wavelength is derived from the phase relationship of Equation (5), setting the phase $\phi_v$ to be 90° and solving for the thickness d. In that manner the maximum reflectance will occur at the wavelength 550 nm. Equation (5) relates the thickness of the constituent film to its index of refraction and the wavelength of light propagating through that film.

$$\varphi_v = \frac{2\pi n_v d_v \cos\theta_v}{\lambda} \quad (5)$$

Equation (6) provides the relationship of an ideal film on an ideal substrate to the individual film properties. The subscripts indicate the interface of the external medium to the first film, 1, and the interface of the film atop the substrate, 2. As an example, one would take the top film as silicon dioxide and the optical substrate would be AlCu. In this example the first interface would be air/$SiO_2$, 1, and the second interface would be $SiO_2$/AlCu, 2. In general the relationship for n number of films is expanded to $2^{n-1}$ products summed in the numerator and $2^{n-1}$ products plus 1 summed in the denominator. These terms include the terms in (5) in addition to the remaining products of the amplitude coefficients, $r_{k+1}$.

$$r_{ideal} = \frac{r_1 + r_2 \exp[-2j(\varphi_1)]}{1 + r_1 r_2 \exp[-2j(\varphi_1)]} \quad (6)$$

In the case of normal incidence the reflection coefficients, $r_v$, are:

$$r_v = \frac{n_{v-1} - n_v}{n_{v-1} + N_v} \quad (7)$$

The REC thus can enhance reflectance from the surface of the pixel cell electrode beyond that of AlCu alone. In theory, the reflectance will asymptotically approach a maximum of 100% as the number of dielectric layers in the interference stack increases. While the reflectance would never become 100%, the reflectance would theoretically increase incrementally as more films are added to the REC.

B. Formation of 4 Layer REC

As shown in FIG. 14, the first embodiment of a process for forming a REC in accordance with the present invention creates a first 860 Å $SiO_2$ film, a second 630 Å $Si_3N_4$ film, a third 860 Å $SiO_2$ film and a fourth 630 Å $Si_3N_4$ film.

Figure 16:
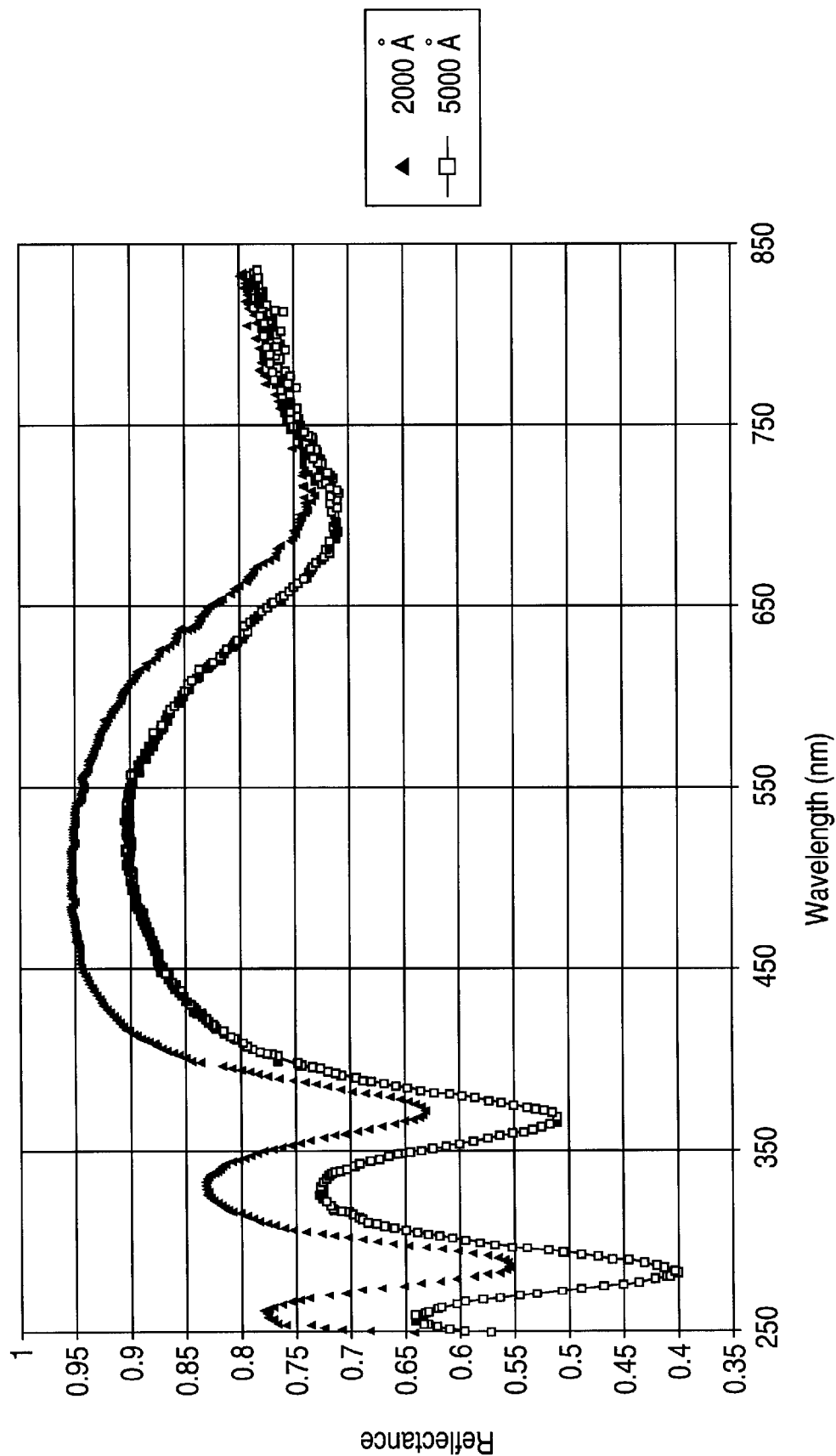
FIG. 16 plots average reflectance of the REC of FIG. 14 on top of pixel electrode layers having a thickness of 2000 Å and 5000 Å.

FIG. 16 shows average reflectance data from this combination of layers on top of pixel electrode layers having a thickness of 2000 Å and 5000 Å. In reviewing FIG. 16, it is important to note the higher reflectance of wafers having a 2000 Å metal layer versus those having a 5000 Å metal layer. This data from FIG. 16 matches the results previously discussed in connection with section 5B and FIGS. 10A–10C and 11, confirming that deposition of a thin metal layer will produce the highest achievable reflectance.

Figure 17:
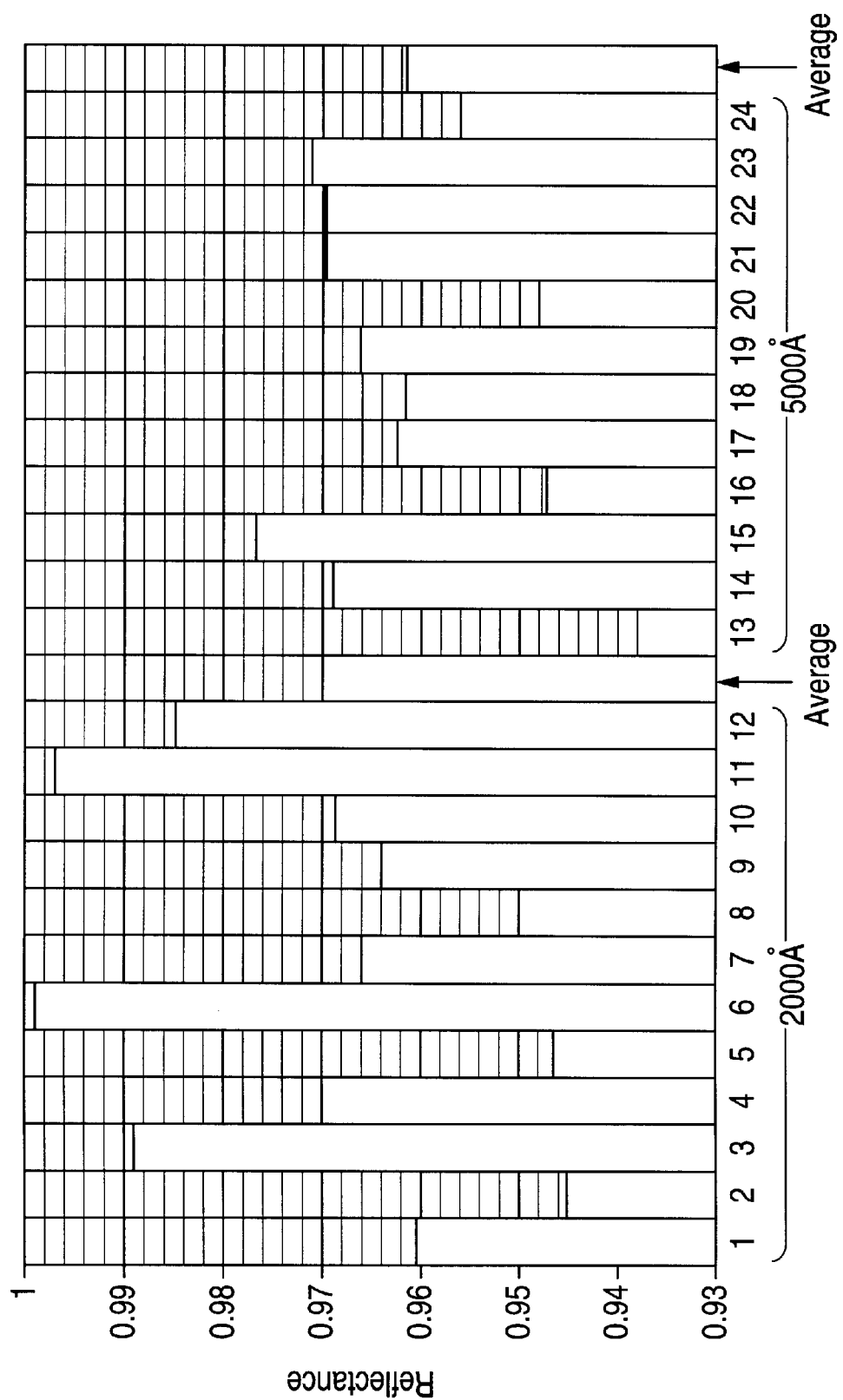
FIG. 17 presents a bar graph of maximum and average reflectance resulting from a simple process flow that creates a REC on top of an aluminum layer formed over silicon.

FIG. 17 presents a bar graph of maximum and average reflectance resulting from a simple process flow that creates a REC on top of an aluminum layer formed over silicon. FIG. 17 indicates that the average reflectance of the REC over a 2000 Å metal layer is one percent higher than the average reflectance of the REC over a 5000 Å metal layer.

C. Effect of Temperature

To understand the effects of temperature of REC deposition upon reflectance, several experiments were conducted. In the first experiment, metal was deposited and the wafers baked under conditions necessary to form a four layer REC as described above. However, no gases flowed during this experiment and thus no films were deposited.

FIGS. 18A–18D show the effect of such thermal exposure upon reflectance. FIGS. 18A–18D plot reflectance for wafers exposed to a REC thermal budget of 4 min at 400° C., 400° C., 350° C., and 300° C. respectively, unaccompanied by the formation of an actual REC.

Figure 18A:
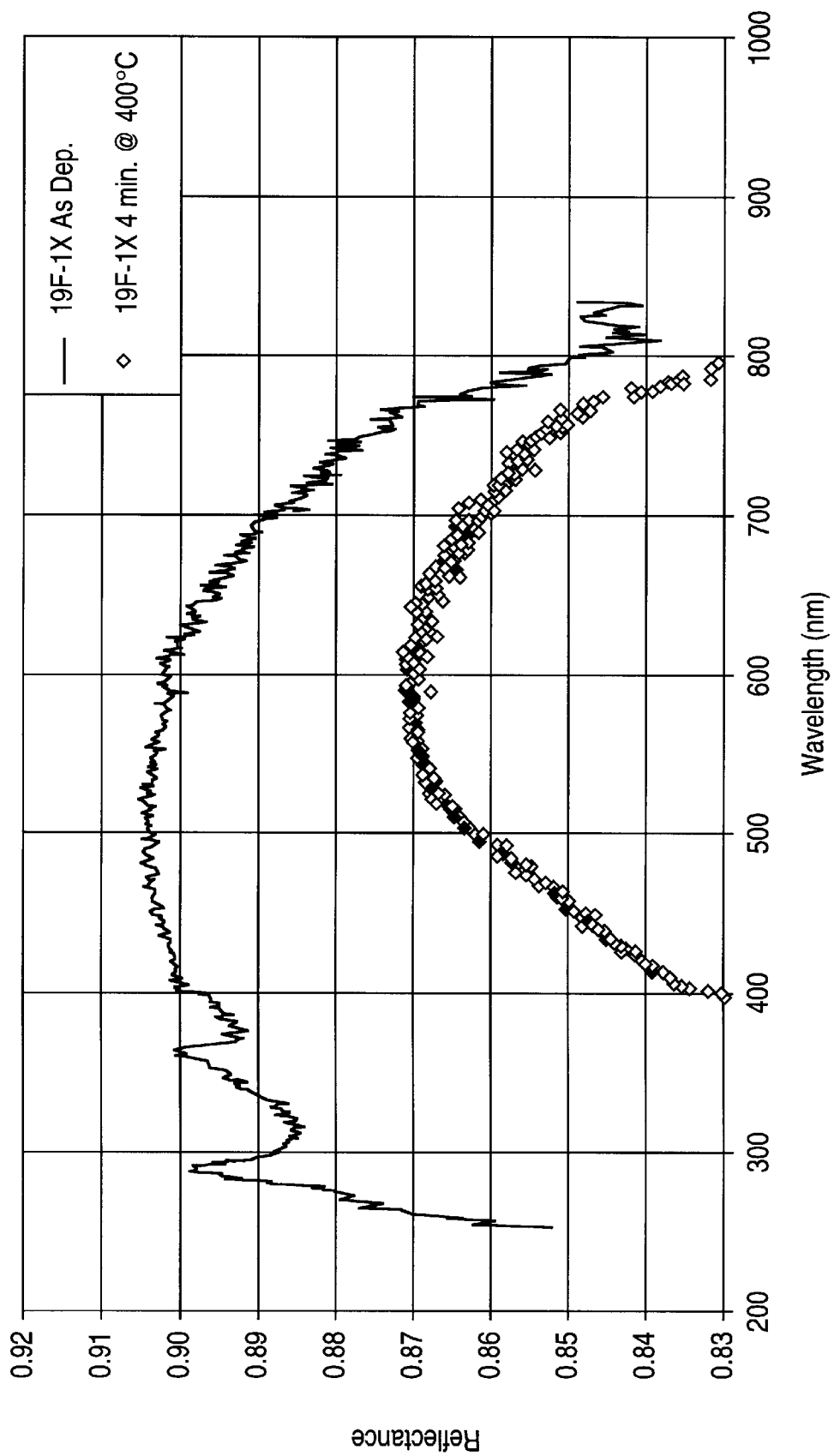
FIGS. 18A–18D plot the effect upon reflectance of a bare metal layer subject to thermal processing equivalent to that utilized in the process to form a four layer REC as described in FIG. 17.
Figure 18B:
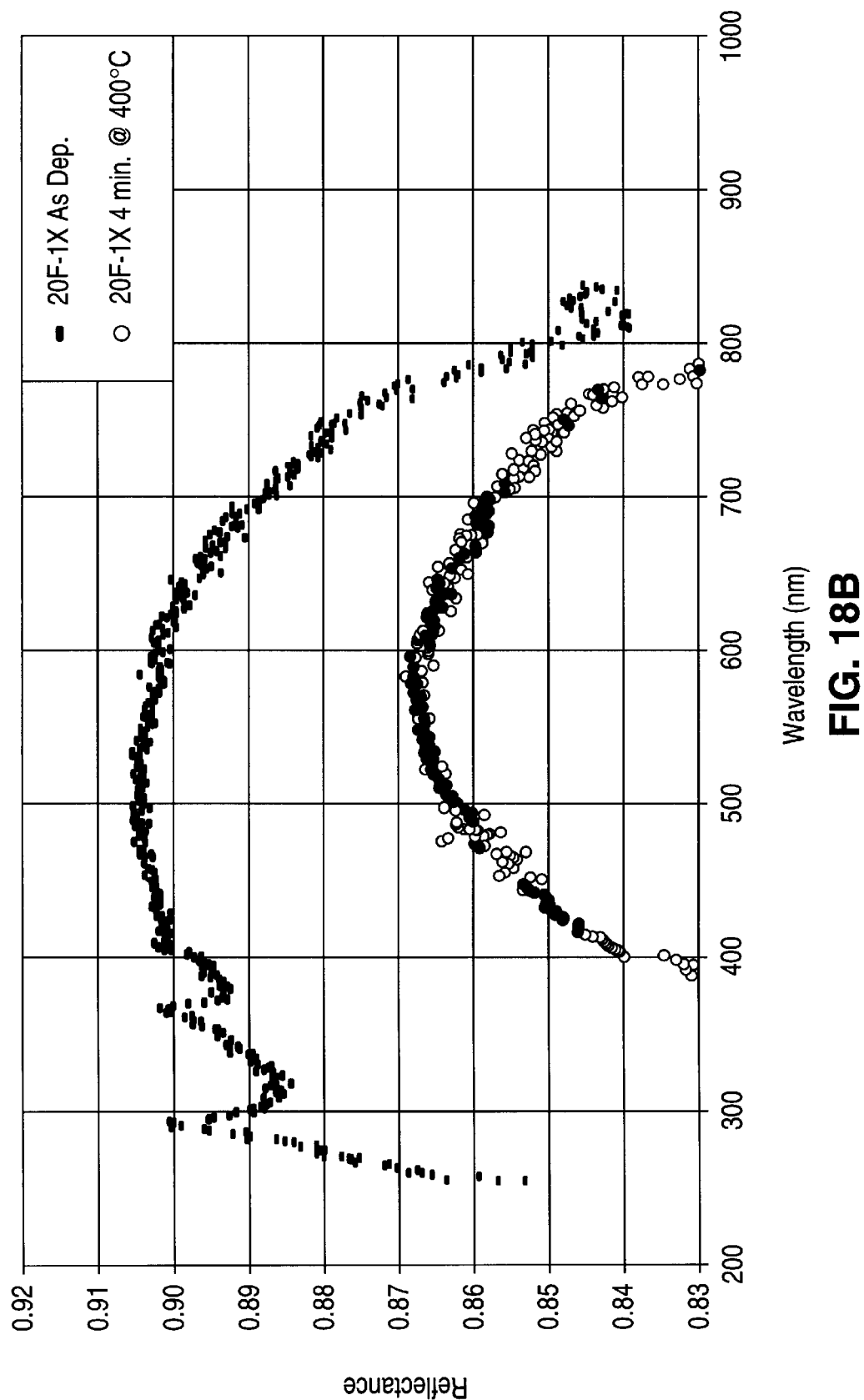
Figure 18C:
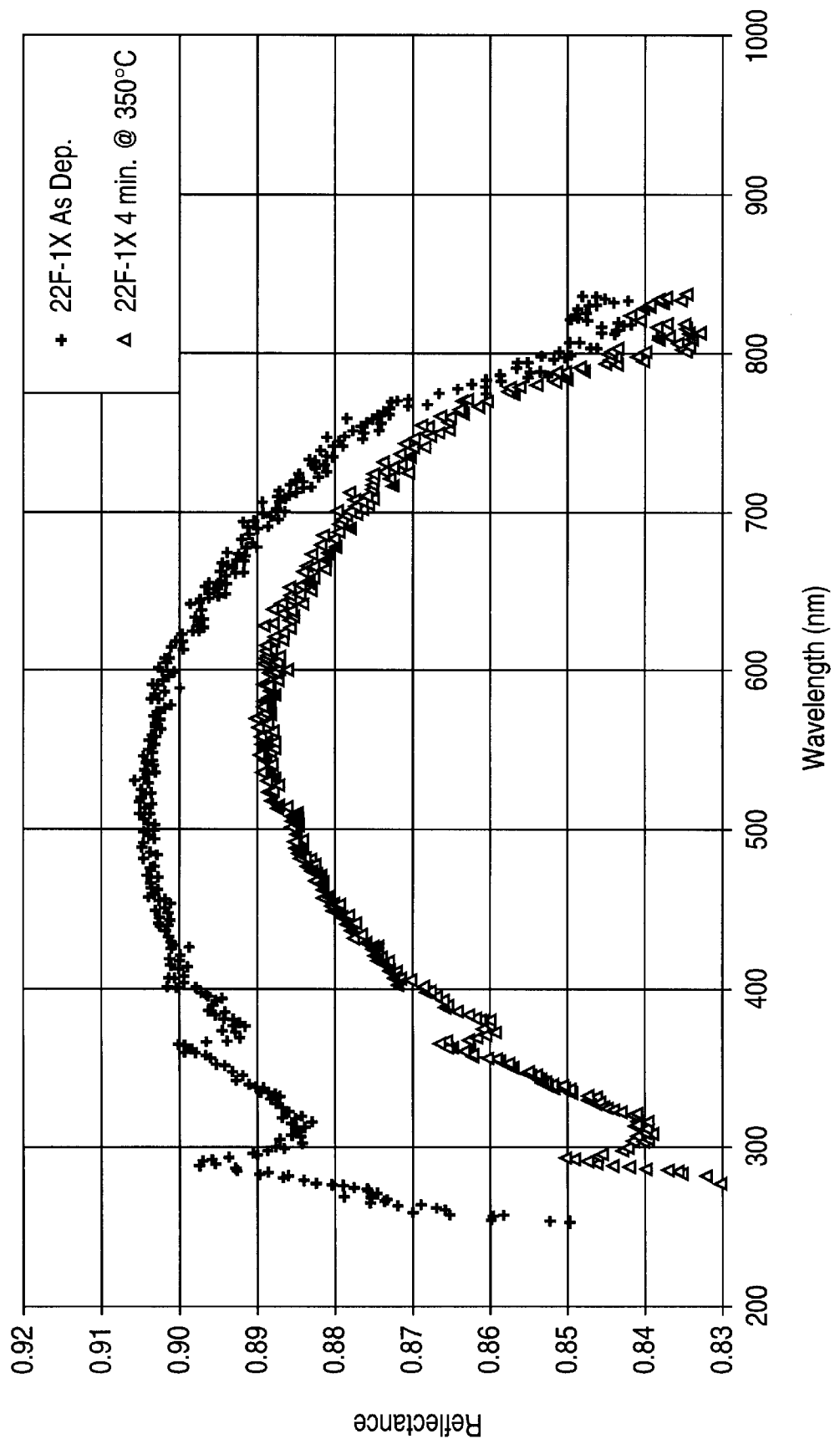
Figure 18D:
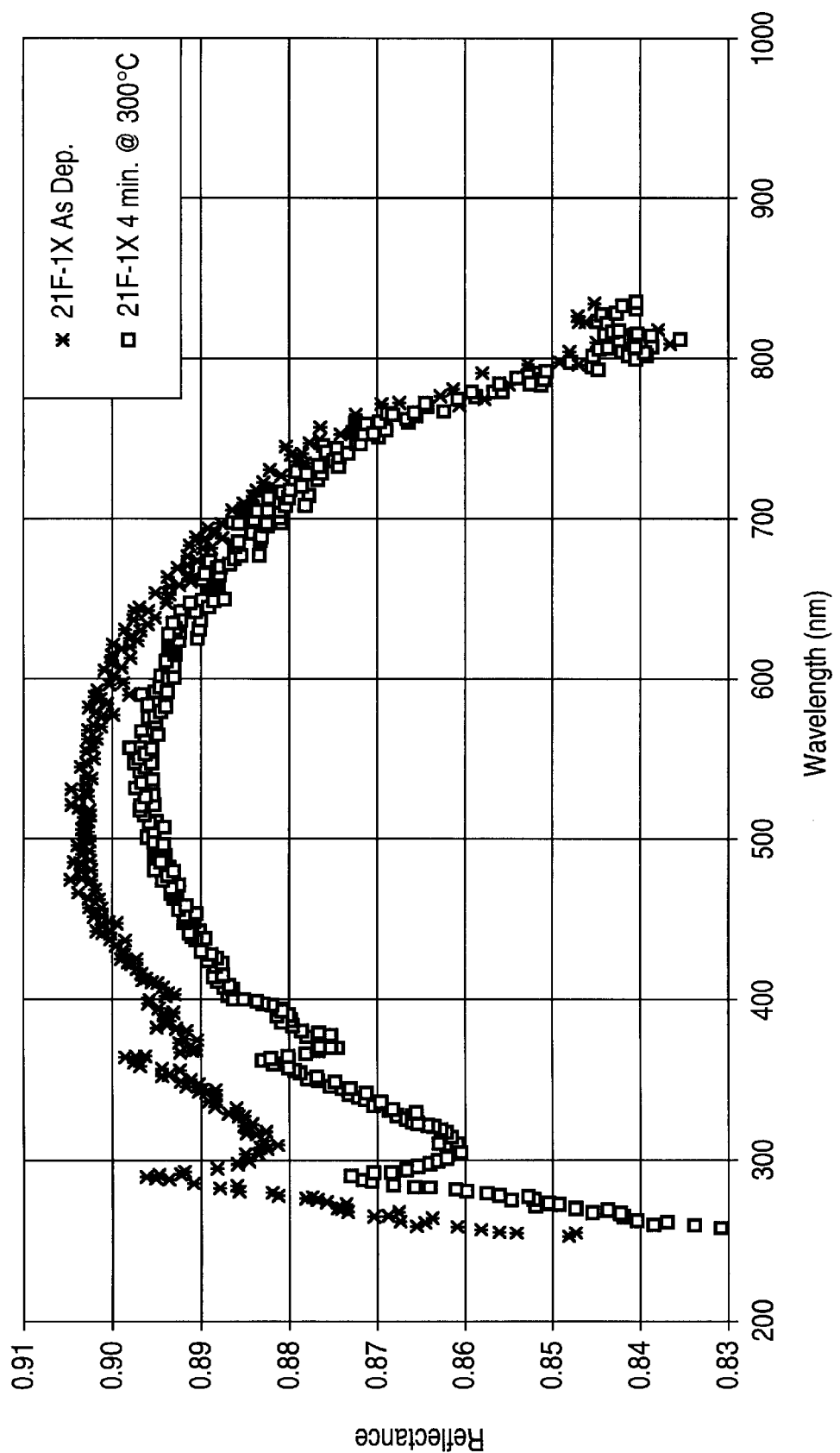

Bare Al exhibits relatively constant reflectance over the visible light spectrum. FIGS. 18A–18D are thus particularly instructive in that because there is no REC, a nearly flat reflectance profile would be expected. Therefore, the variance in reflectance of FIGS. 18A–18D is attributable to surface roughness. In comparing FIGS. 18A–18D, the optimum REC deposition temperature is 300° C. as shown in FIG. 18D. This temperature roughens the AlCu the least, given the resulting small decrease in reflectance.

Figure 19A:
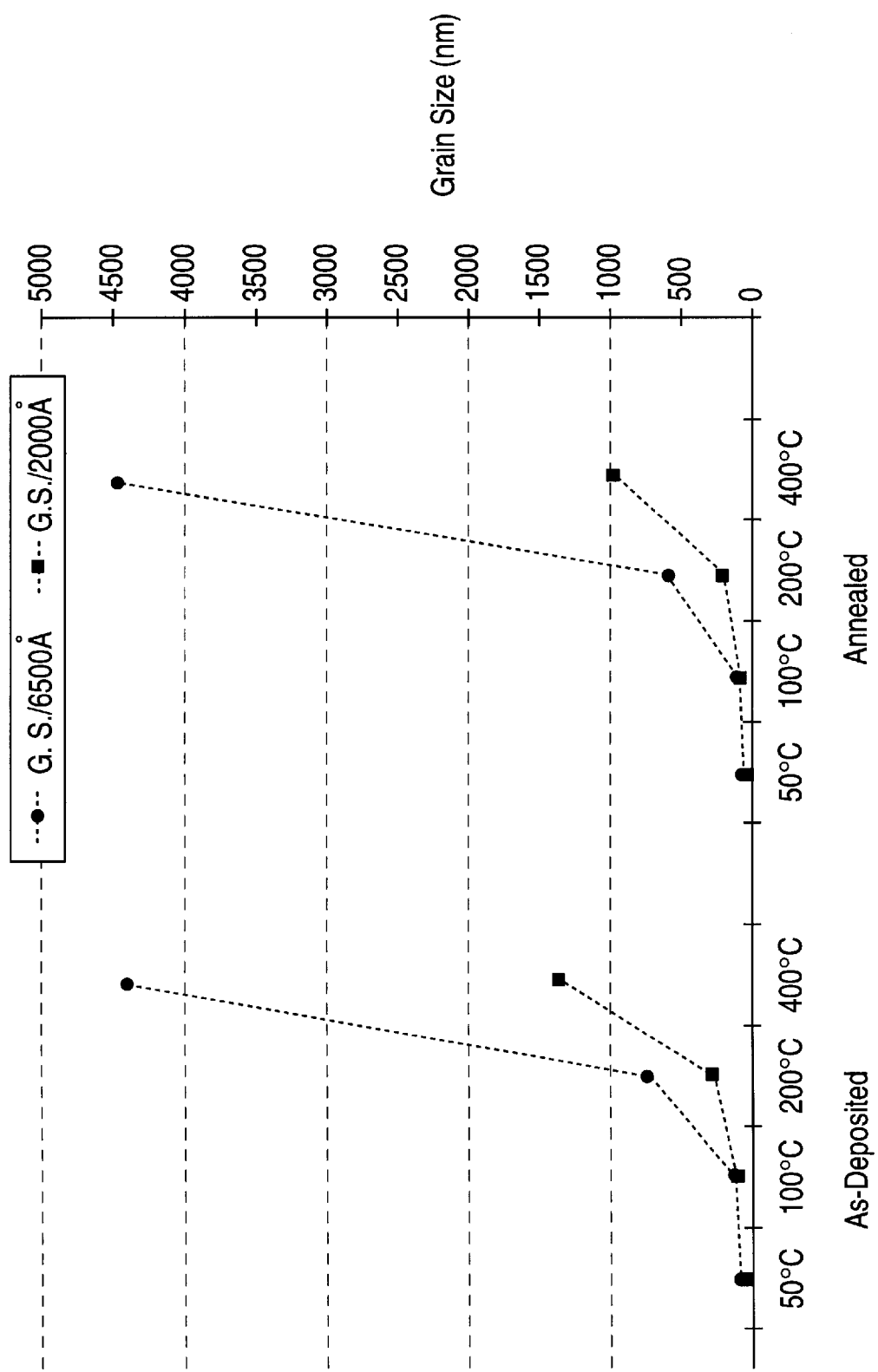
FIGS. 19A–19C plot the effect upon grain size, surface roughness, and reflectance of annealing pixel electrode layers having thicknesses of 6500 Å and 2000 Å.
Figure 19B:
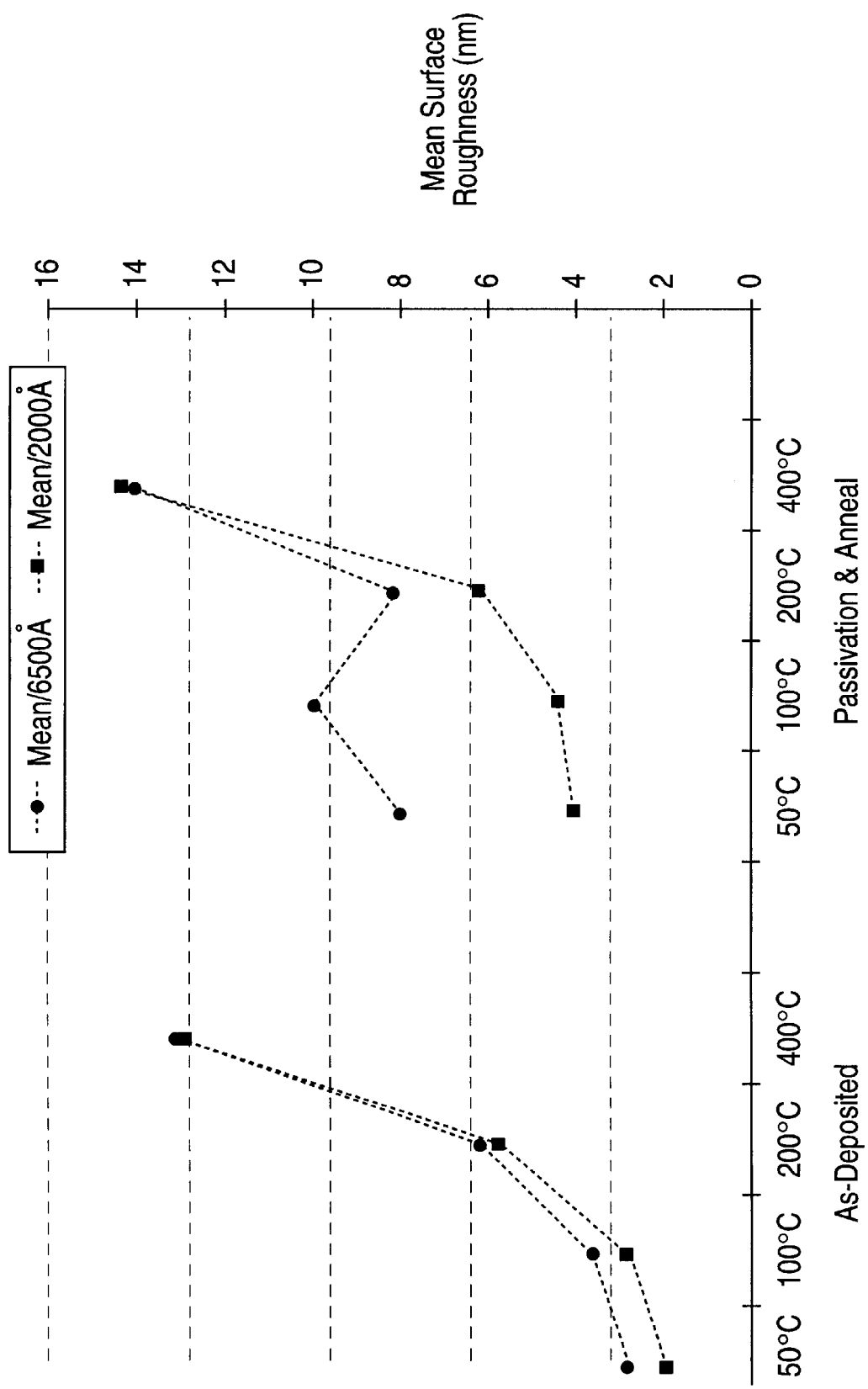
Figure 19C:
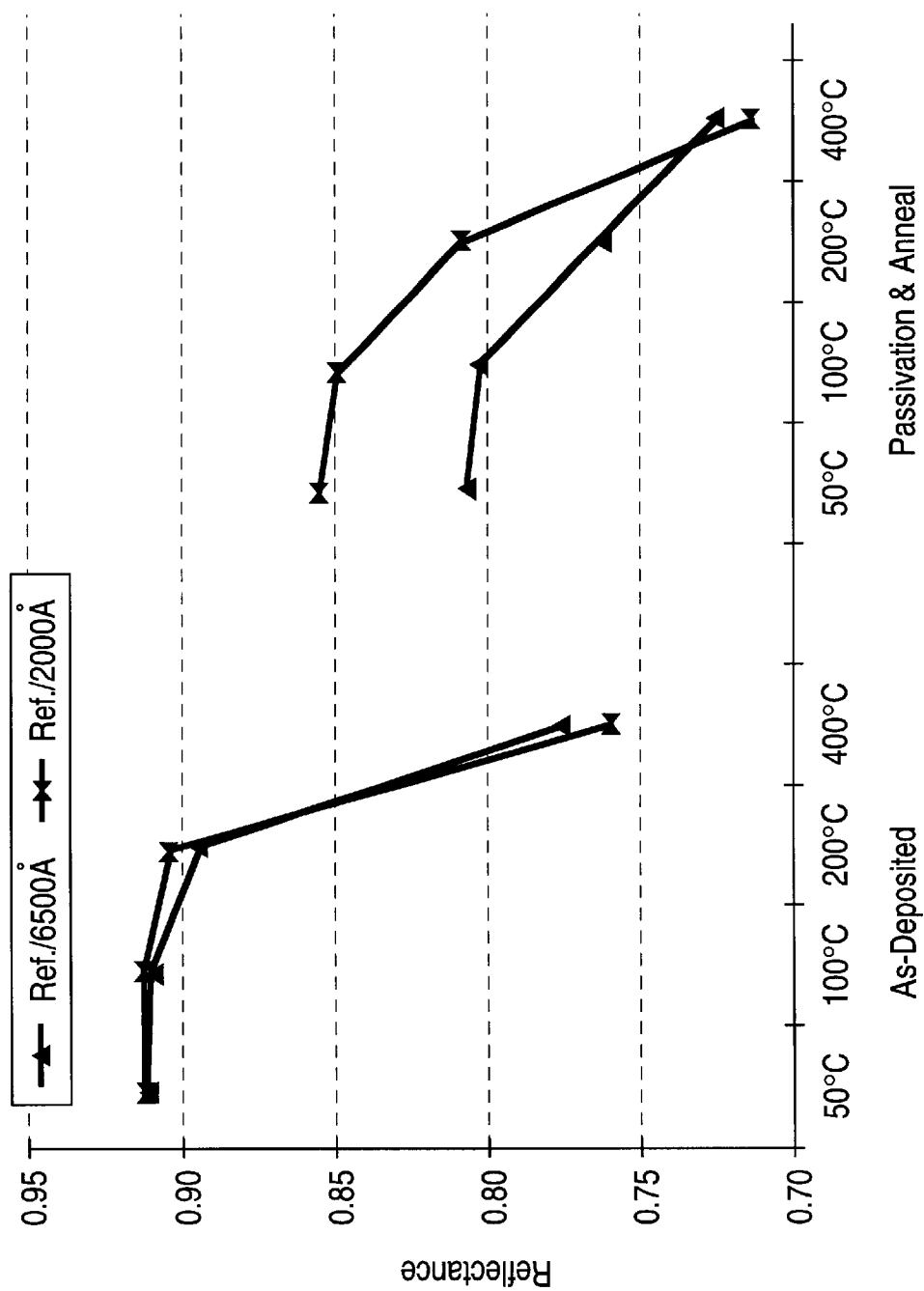

FIGS. 19A–19C also demonstrate the effect upon reflectance of the pixel electrode due to high processing temperatures subsequent to the deposition of the metal layer. FIG. 19A shows the changes in grain size of 6500 Å and 2000 Å AlCu layers that are subject to annealing at a variety of temperatures for one hour. FIG. 19B shows the changes in surface roughness of the 6500 Å and 2000 Å AlCu layers that are subjected to formation of a passivation layer and then annealed at a variety of temperatures for one hour. FIG. 19C shows the changes in reflectance of the 6500 Å and 2000 Å AlCu layers that are subjected to the formation of a passivation layer and then annealed at a variety of temperatures for one hour.

As indicated in FIG. 19A, grain size does not change appreciably after deposition following the annealing step. However, as indicated in FIGS. 19B and 20C, both the 6500 Å and 2000 Å metal layers experienced increased surface roughness and decreased reflectance following annealing.

Figure 20:
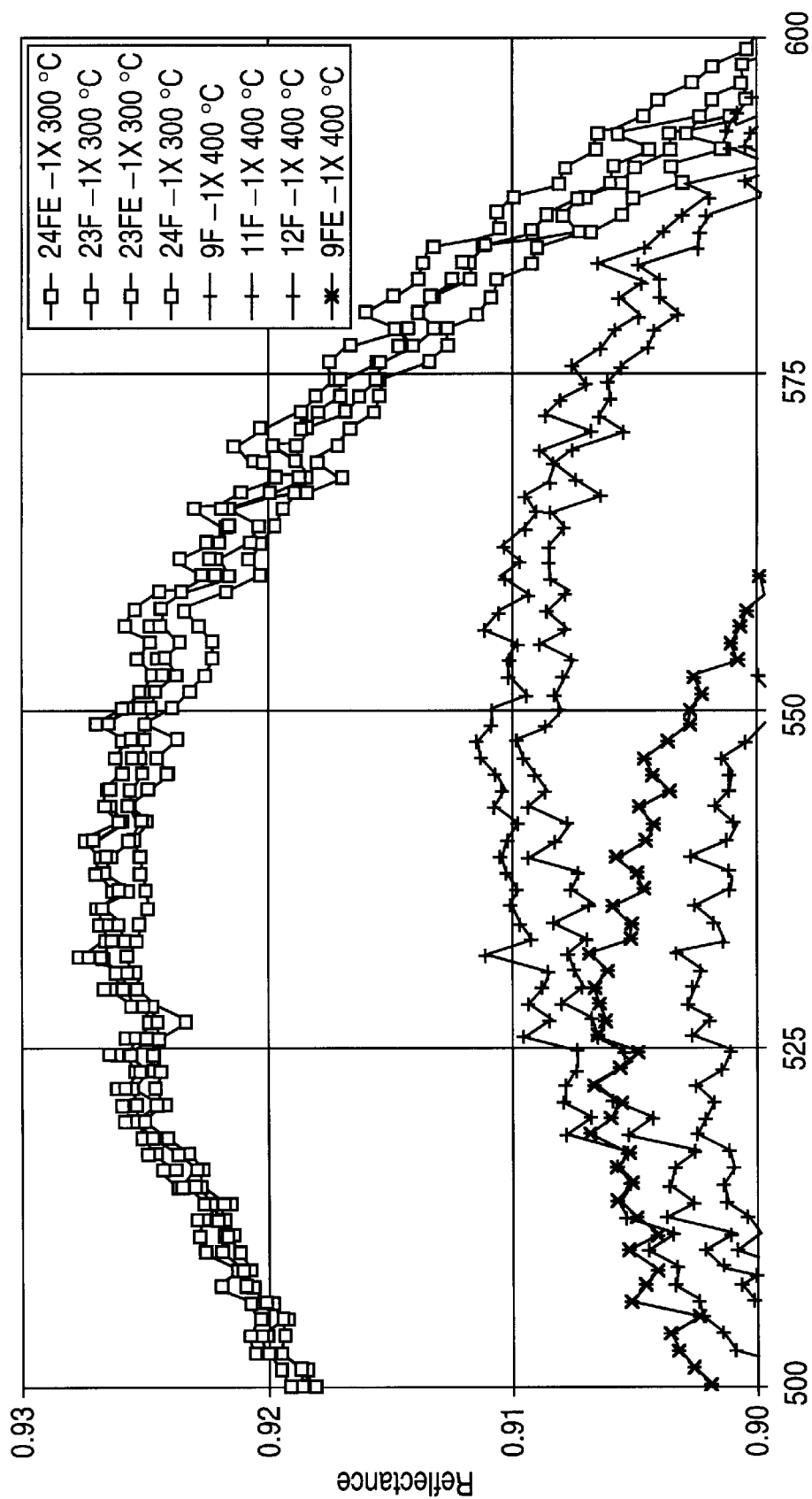
FIG. 20 plots reflectance of wafers having a four layer REC deposited at either 300° C. or 400° C. in accordance with the process of the present invention.

A second experiment was conducted to verify the correlation between loss in reflectivity and high REC deposition temperature. FIG. 20 plots reflectance data of wafers having a four-layer REC deposited at 300° C. and 400° C. The significant decrease in the reflectance of the wafers having REC deposited at 400° C. confirms the correlation between low REC deposition temperature and enhanced reflectance.

In assessing the effect upon reflectance of a REC layer above the metal surface, it is also important to recognize that reflectance of the pixel cell electrode layer is dependent not only upon (1) the absolute temperature of metal deposition (see section 5A above), and (2) the absolute temperature of REC deposition (see discussion immediately above), but is also dependent upon (3) the difference in temperature between metal deposition and REC deposition.

Figure 21:
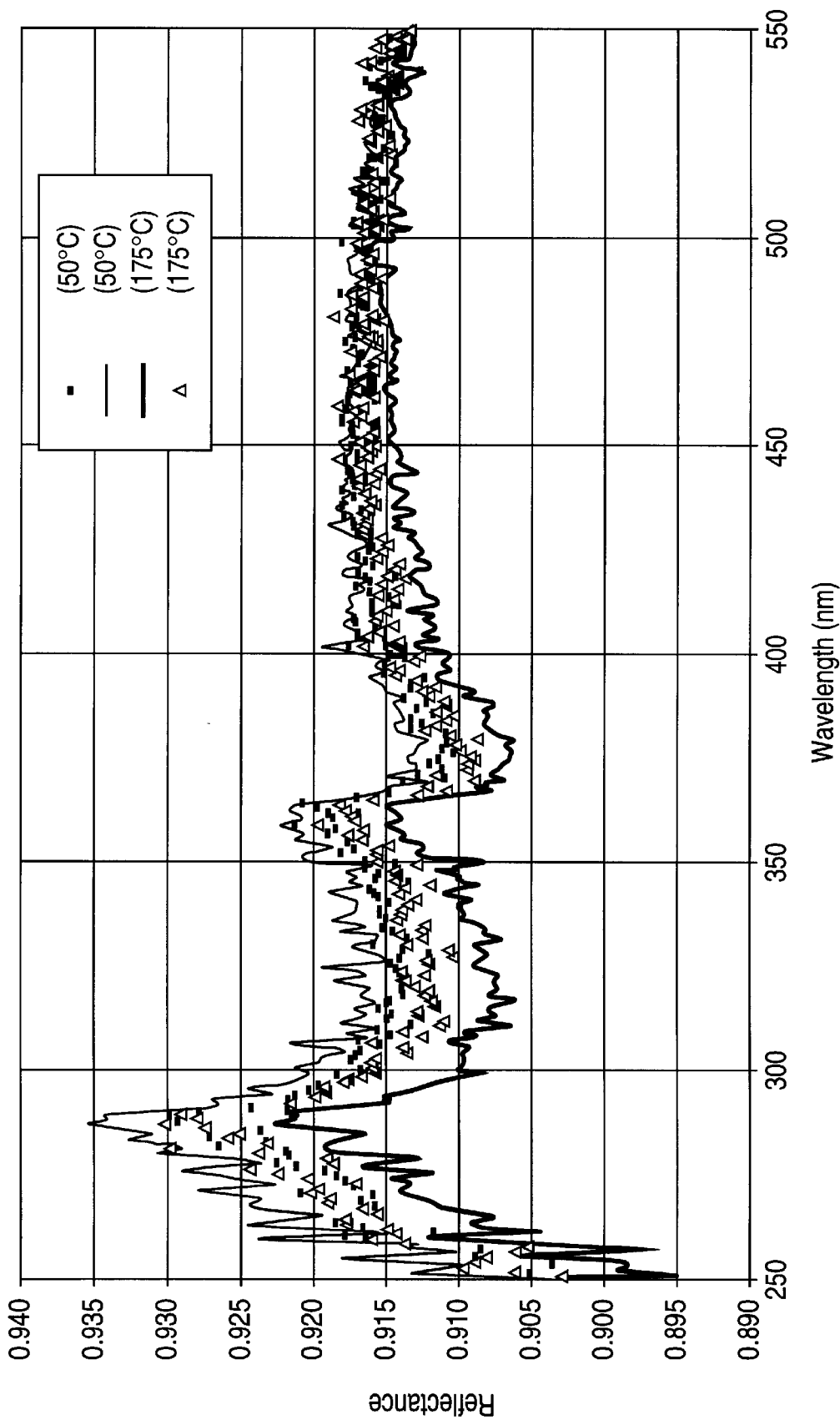
FIG. 21 plots reflectance following deposition of a 5000 Å AlCu pixel electrode layer on top of a 400 Å pixel adhesion layer under four combinations of metal deposition temperature and REC deposition temperature.
Figure 22:
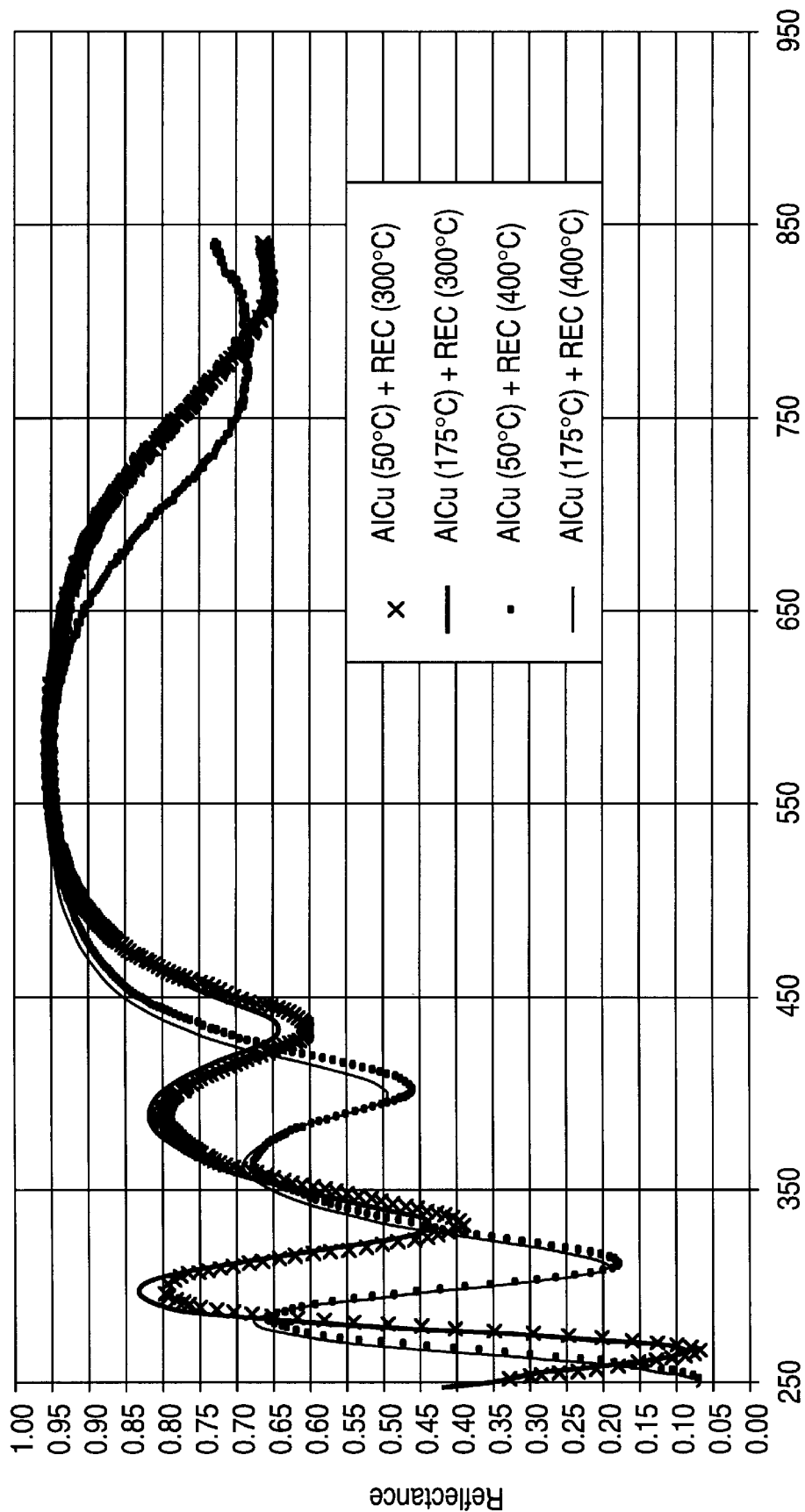
FIG. 22 plots reflectance following formation of a four layer REC on top of the 5000 Å pixel electrode layer and the 400 Å pixel adhesion layer deposited under the four combinations of metal deposition temperature and REC deposition temperature of FIG. 21.

Table 1 and FIGS. 21 and 22 illustrate this point. Table 1 shows four combinations of metal and REC deposition temperature conditions.

TABLE 1

| Combination | AlCu Deposition Temp (° C.) | REC Deposition Temp (° C.) | ΔT (° C.) |
|---|---|---|---|
| 1 | 50 | 300 | 250 |
| 2 | 175 | 300 | 125 |
| 3 | 50 | 400 | 350 |
| 4 | 175 | 400 | 225 |

FIG. 21 illustrates reflectance following deposition of 5000 Å AlCu on top of a 400 Å Ti pixel adhesion layer under temperature combinations 1–4 shown in Table 1. FIG. 22 illustrates reflectance following formation of a four layer REC on top of the metal deposited under temperature combinations 1–4.

As suspected, optimum reflectance is generally observed in combination 2, where the difference between the temperature of AlCu deposition and the temperature of REC deposition is the lowest (125° C.). This is likely attributable to the formation of hillocks in the AlCu layer due to shear forces generated by the differential coefficient of thermal expansion between AlCu and the overlying REC. Where the difference in temperature at the time of formation of the metal and REC is minimized, the difference in thermal expansion will also be minimized, producing less shear stress on the AlCu. This lowering of shear stress in turn produces fewer hillocks.

Ideally, the difference between the metal and REC deposition temperatures would be zero. However, attaining this goal has been elusive because the lowest range for depositing REC is currently between 300 and 400° C. Unfortunately, large grains of AlCu form at these high temperatures and degrade reflectance, as discussed above in connection with section 5A and FIGS. 9 and 10A–10C.

Thus, the process challenge solved by the present invention was optimization of conditions leading to formation of AlCu having small grains while maintaining a small difference between AlCu and REC deposition temperature and thus low hillock density.

FIGS. 21 and 22 demonstrate the advantage in reflectance achieved by maintaining the difference in AlCu deposition temperature and REC deposition temperature as small as possible. FIGS. 21 and 22 also demonstrate that initial roughness caused by the larger AlCu grains formed at 175° C. versus 50° C. did not negate the advantage conferred by the REC.

B. Effect of Multilayered REC

Figure 23A:
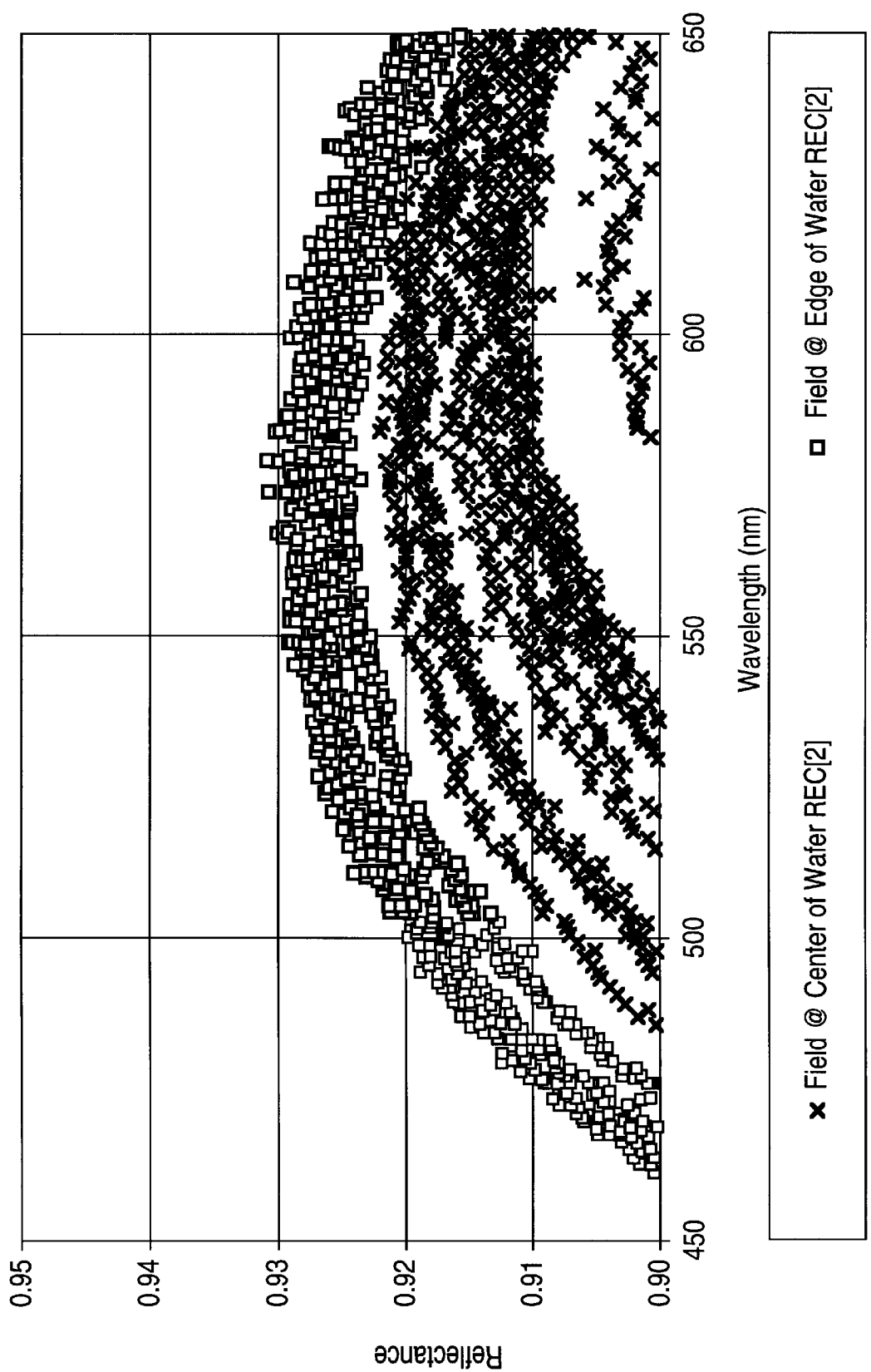
FIGS. 23A–23B plot reflectance measured after deposition of a two layer REC, and after deposition of a four layer REC.
Figure 23B:
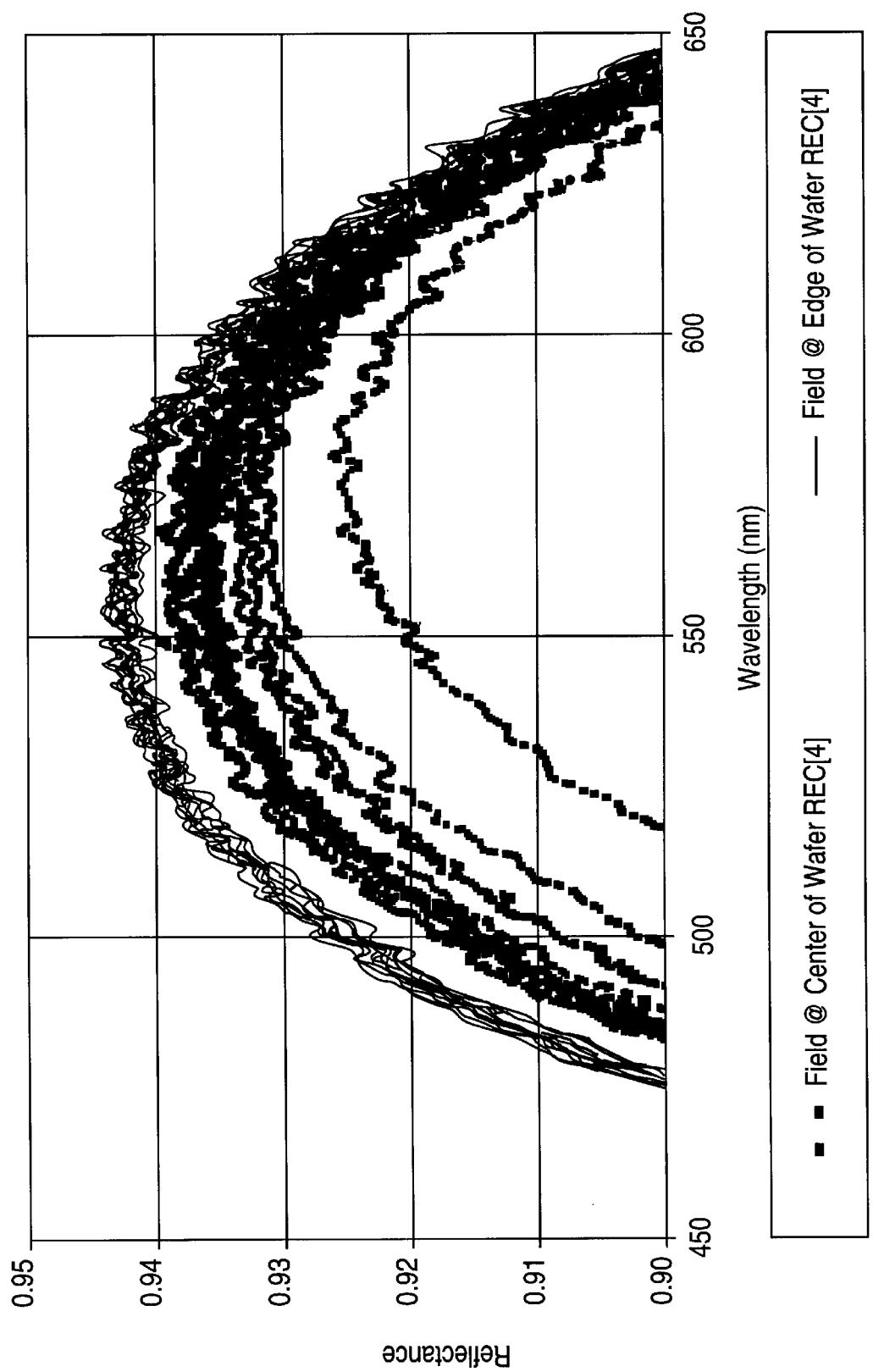

Due to the lack of roughness created in the REC films during deposition of the third and forth layers, reflectance should be greater in a two layer REC. FIGS. 23A and 23B plot reflectance measured after deposition of a two layer REC, and after deposition of a four layer REC. FIG. 23A plots field reflectance at the center of the wafers. FIG. 23B plots field reflectance at the edge of the wafers.

Comparison of reflectance data from FIGS. 23A and 23B reveal that the effect of roughness created during film deposition does not diminish the reflectance of the four layer REC as compared to the two layer REC.

Figure 24:
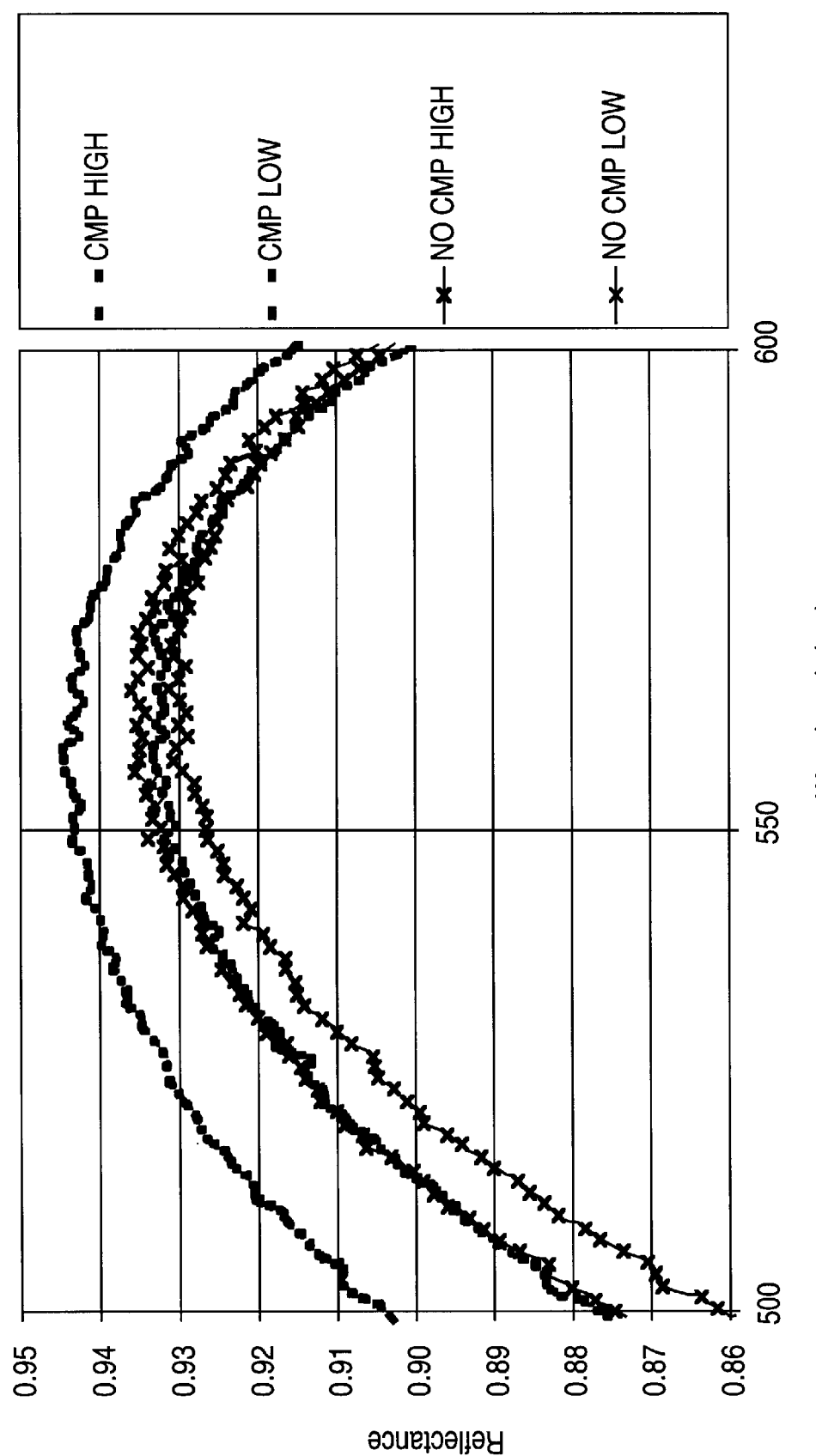
FIG. 24 plots maximum and minimum reflectance of a metal layer covered by a six layer REC.

The theory underlying operation of the REC as described above predicts that addition of layers would produce an increase in reflectance. FIG. 24 illustrates the maximum and minimum reflectance of a metal layer covered by a six layer REC.

Comparison of FIGS. 23A–23B and FIG. 24 reveals that experimental results did not correlate with theory. Specifically, higher reflectance was observed in the case of a four layer REC than in the case of a six layer REC. This departure from theory suggests that the increased thermal energy associated with deposition of the additional two films created additional roughness and eliminated any potential advantage in reflectance conferred by constructive interference from the additional layers of REC.

Comparison of FIGS. 23A–23B and FIG. 24 also reveals that the maximum reflectance versus wavelength was approximately equal as between the four and six layer REC. Additionally, FIG. 24 reveals that the bandwidth of reflected light was significantly truncated by adding the last two layers of REC. Thus, the data suggests that the thermal effects of REC deposition inherently limit the maximum reflectance achievable by creating an interference stack atop a 5000 Å AlCu layer.

8. Reflectance of Pixel vs. Field

During examination of the effect of processing upon reflectance, an unexpected source of systematic variation arose between the smaller 12 mm pixel region of the wafer, and the unpatterned portion of the test site, sometimes referred to as the "field". This difference in reflectance may be attributable to several different factors.

A. REC Thickness of Field vs. Pixel

Figure 25:
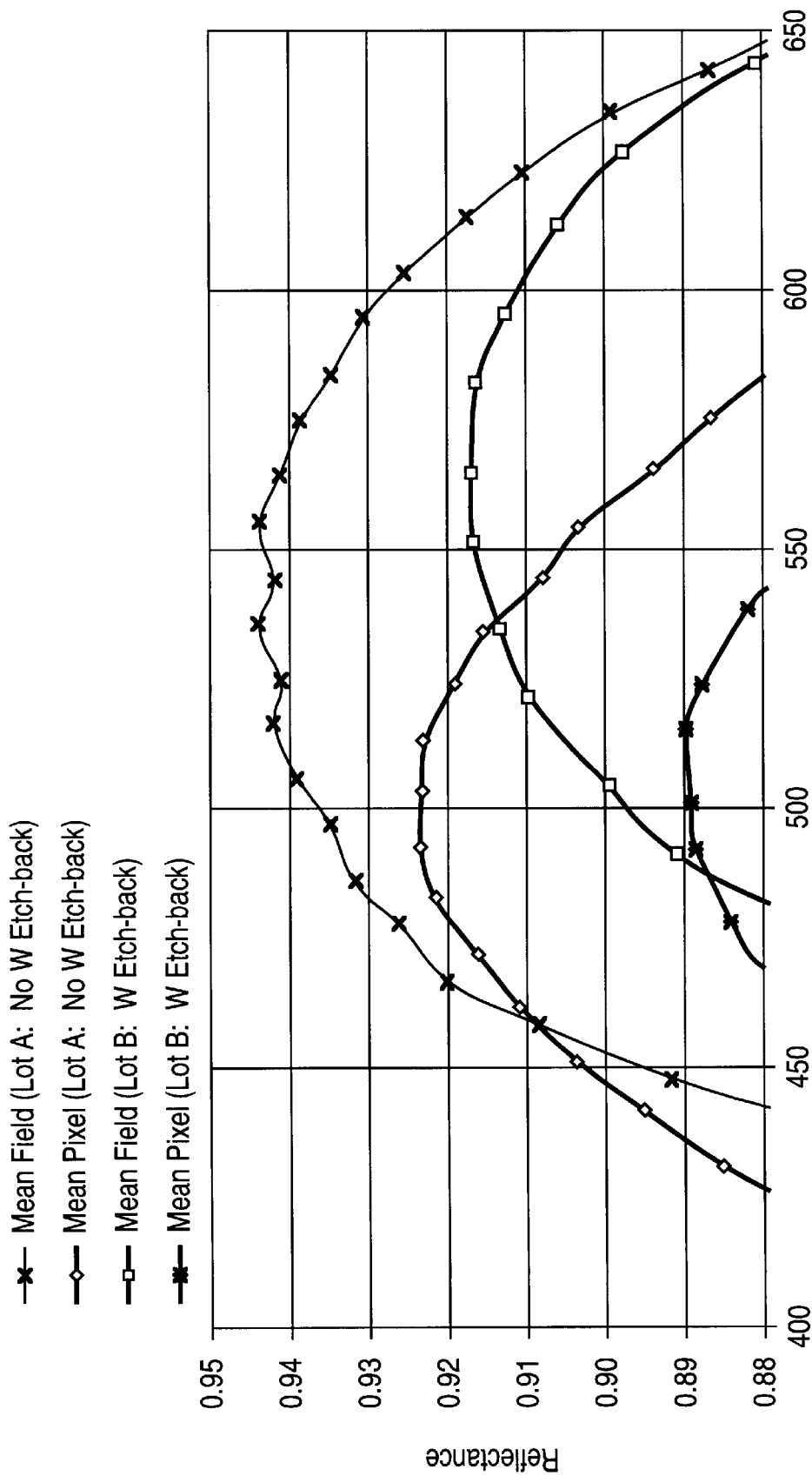
FIG. 25 plots reflectance in the field and pixel region of a lot of wafer's including via processing and a lot of wafers not including via processing.

Differing thickness in the REC overlying the pixel and field regions was initially indicated from review of the reflectance data shown in FIG. 25. FIG. 25 illustrates reflectance measurements from the field region and the pixel region of two lots of wafers: lot A included vias underlying the metal layer and lot B did not include such vias. In both lot A and lot B, the reflectance of the field region was greater than reflectance of the pixel region.

Figure 26:
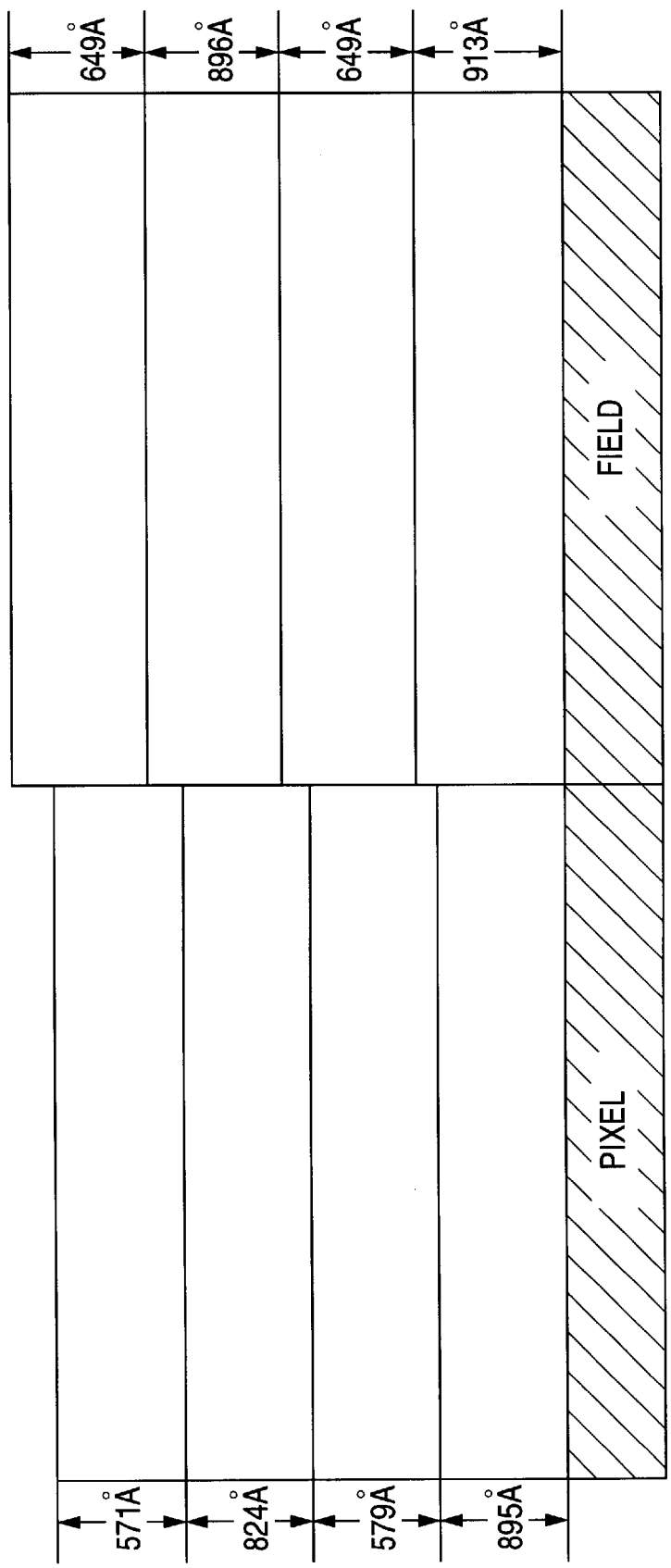
FIG. 26 shows a representation of a TEM cross-section of a four layer REC over field and pixel regions of a wafer from the same lot.

This result is confirmed by FIG. 26. FIG. 26 shows TEM cross sections over field region and pixel regions showing the thickness of a four layer REC. FIG. 26 consistently indicates the increased thickness of the REC layers over the field region as contrasted with their thickness over the pixel region.

Figure 27:
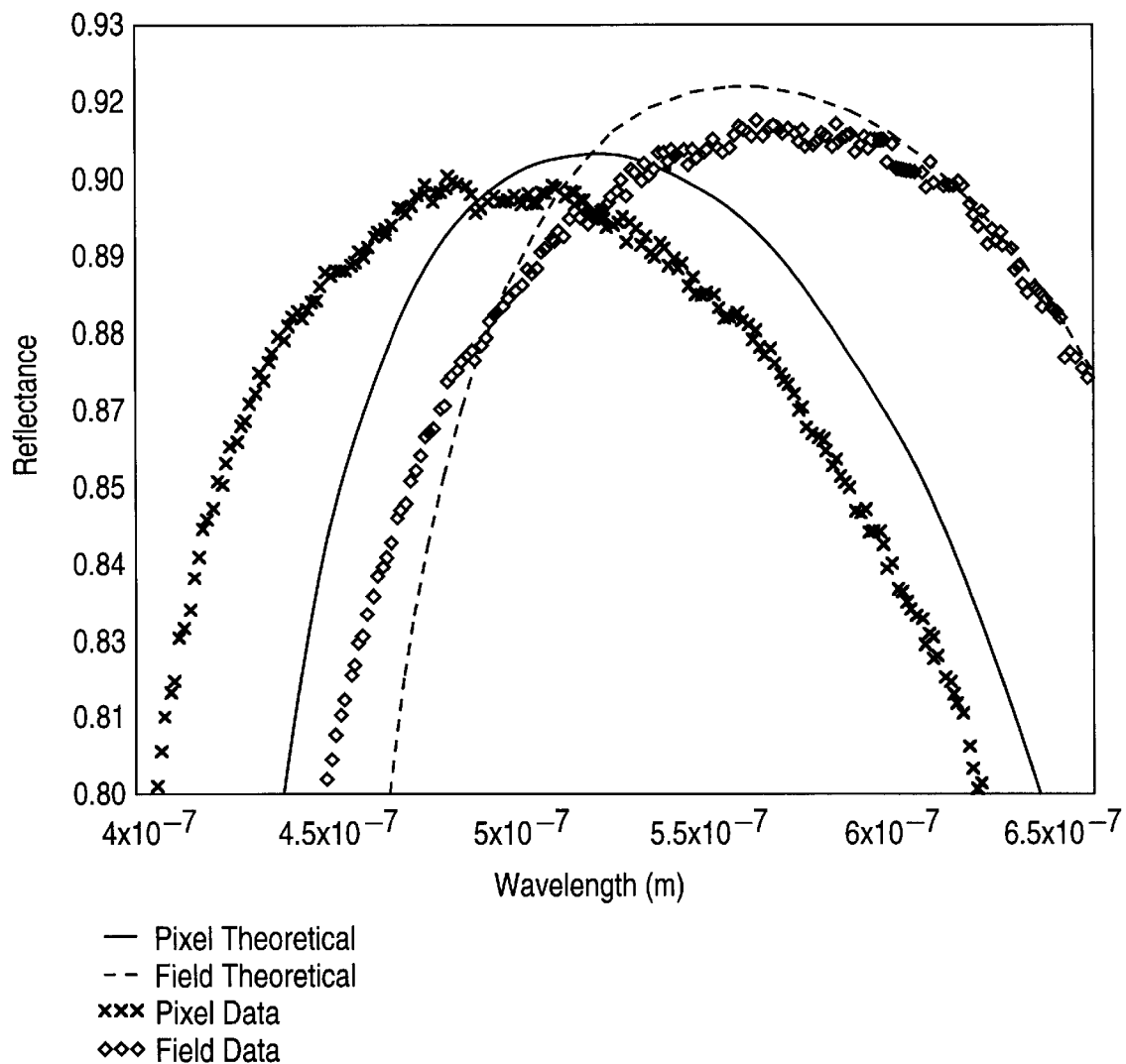
FIG. 27 plots theoretical and measured reflectance of the wafer whose TEM cross-section is shown in FIG. 26.

FIG. 27 presents theoretical and measured reflectance of the wafer whose cross-section is shown in FIG. 26. Theoretical reflectance is calculated utilizing Equation (5) and the film thicknesses shown in FIG. 26. Although the theoretical and measured reflectance spectra are not in exact agreement, FIG. 27 verifies the predicted relationship between thickness and spectral response: as the REC film thickness decreases, the reflectance spectra shifts to the left of the wavelength spectra.

Possible sources of error attributed to the difference in theoretical and measured reflectance spectra are:

(1) incorrect extrapolation of the thickness from the TEM are incorrect;

(2) incorrect dispersion of AlCu used in the calculation, and/or (3) measurement of reflectance on the wafer not the same location as the TEM cross-section (i.e., the thicknesses were not the same).

B. Pixel "Dimple"

Figure 2:
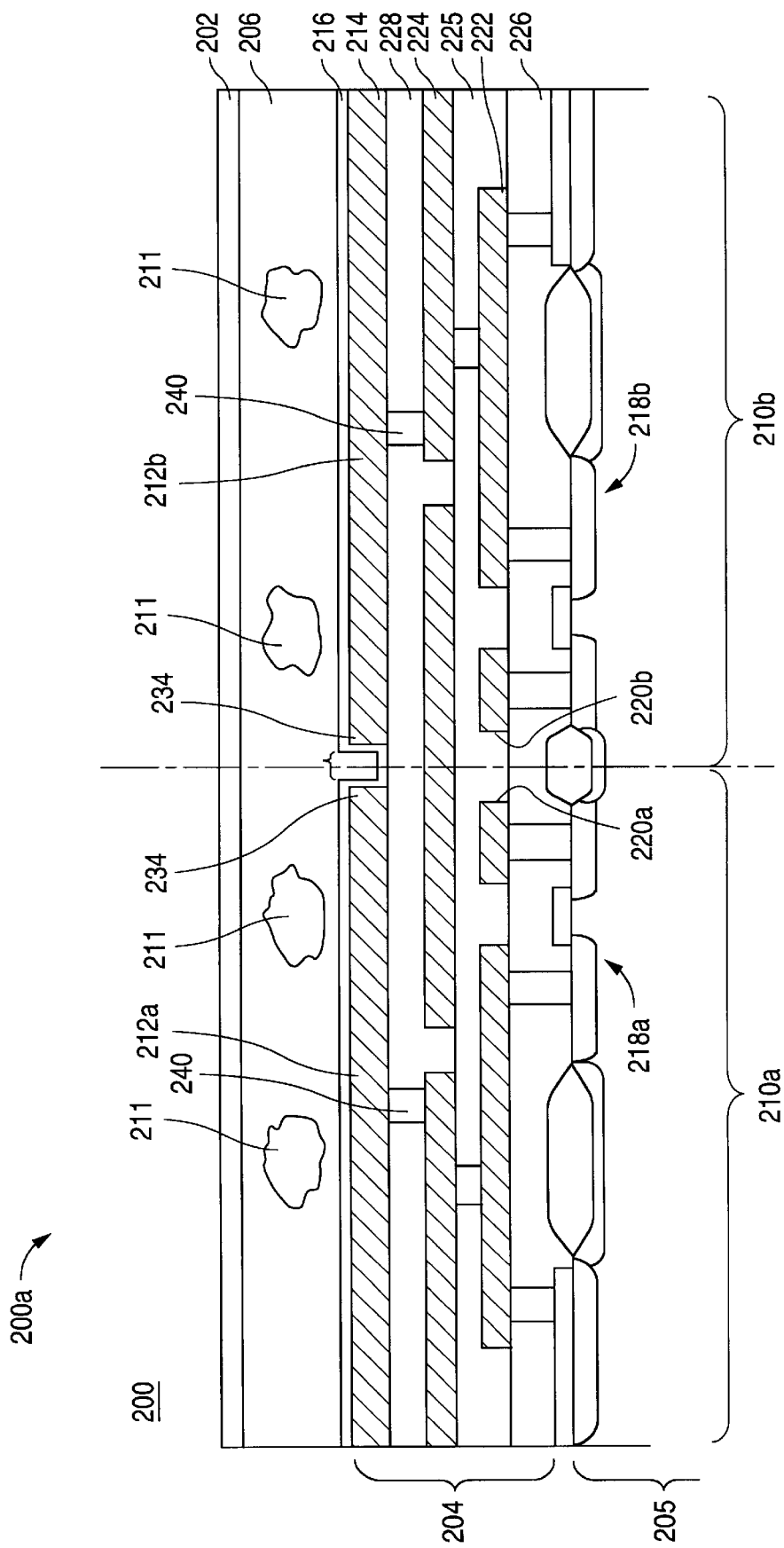
FIG. 2 illustrates a cross-sectional view of adjacent pixel cell structures that form a portion of a conventional light valve.

As shown in FIG. 2, the pixel electrodes 212a and 212b make electrical contact with the underlying storage capacitor structures 218a and 218b through underlying via 240 and interconnect metallization 222 and 224. Specifically, FIGS. 3C–3E, show etching of via 340 into the highest intermetal dielectric layer 328. Next, a via liner layer 342 comprising of titanium and titanium nitride is formed, and then tungsten 344 is deposited over the entire wafer. Finally, tungsten 344 is globally etched from the wafer surface.

This final etch shown in FIG. 3E removes tungsten in a direction normal to the surface of the wafer, and as a result leaves tungsten in the void which was previously created in the highest intermetal dielectric layer. To ensure that no residual tungsten is left on the surface of titanium nitride atop the highest intermetal dielectric layer, the tungsten etch is increased for a duration that is slightly longer than needed to etch the maximum tungsten thickness. As a result of this overetch, the tungsten plug 344a is located slightly lower than the surface of the titanium nitride via liner layer.

As the pixel electrode layer 312 is formed above the via, the deposited AlCu conforms to the titanium nitride and tungsten plug topography and a depression or "dimple" 347 is formed in the center of the pixel electrode.

Figure 28:
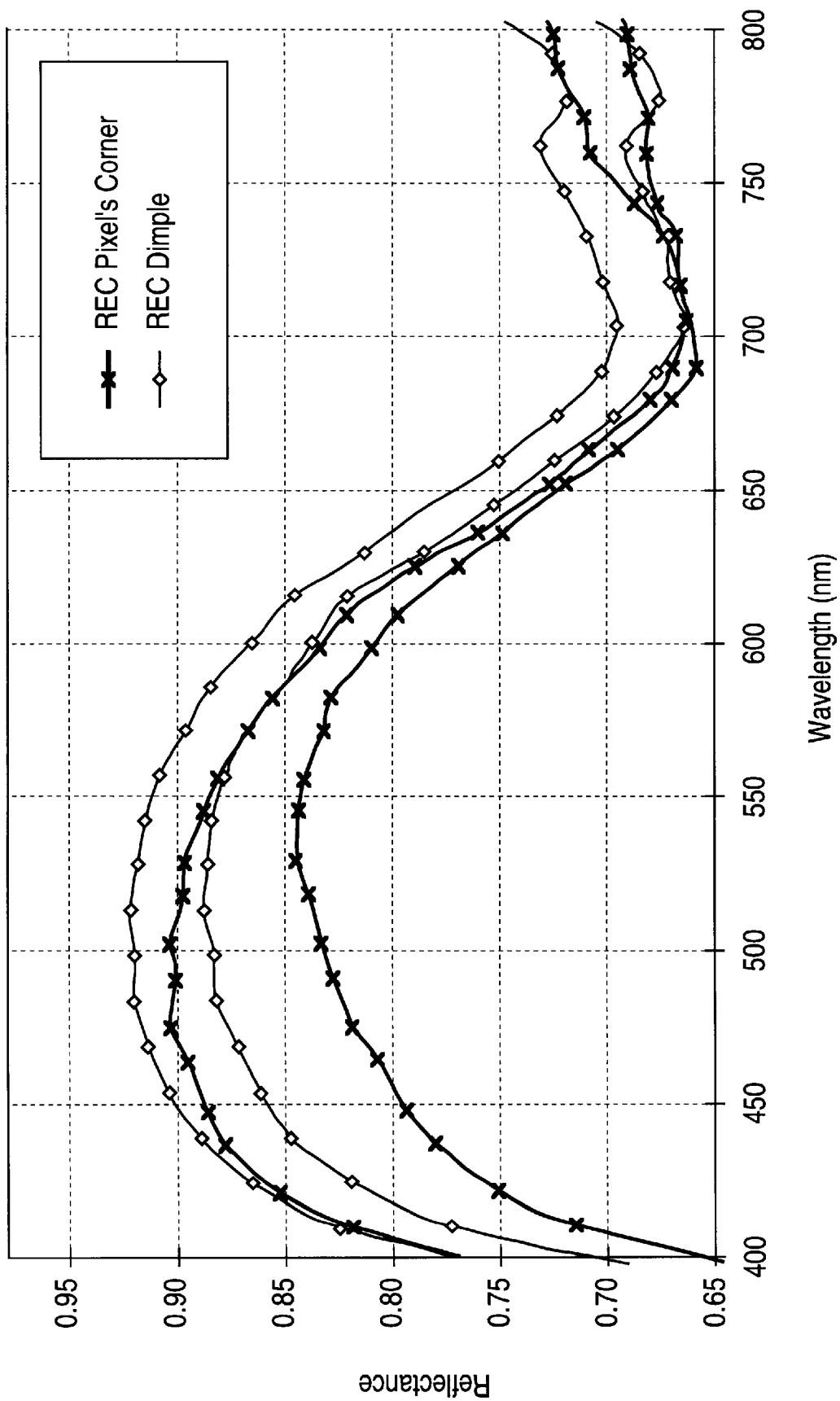
FIG. 28 plots maximum and minimum reflectance of the center (pixel region) and corner (field region) of pixel cells on the same wafer.

FIG. 28 illustrates high and low reflectance respectively, of the center and corner (field region) of pixel cells on the same wafer. FIG. 28 indicates that reflectance was consistently lower in the pixel region than in the field region. This difference in reflectance may possibly be attributable to 1) scattering from the edge of the pixel, 2) diffraction from the edge of the pixel, or 3) misalignment of the 10 μm diameter of the measurement spot (which is approximately the same size as the pixel).

9. Conclusion

FIGS. 29A–29M show cross-sectional views of a process flow that incorporates steps in accordance with the various embodiments of the present invention.

Figure 29A:
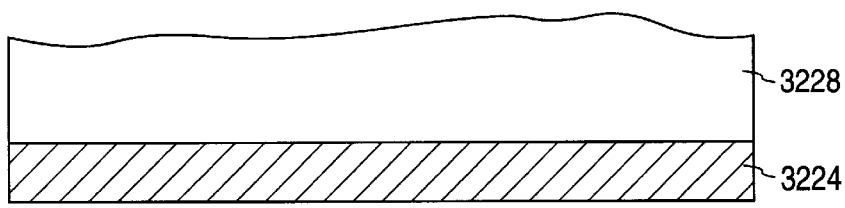
FIGS. 29A–29M show cross-sectional views of a process flow that incorporates many of the processing steps in accordance with the present invention.
Figure 29B:

FIG. 29A, identical to FIG. 3A, illustrates formation of highest intermetal dielectric layer 3228 upon lower metallization layer 3224. FIG. 29B, identical to FIG. 32, illustrates leveling of the surface of the higher intermetal dielectric layer using the process of SOG planarization.

Figure 29C:
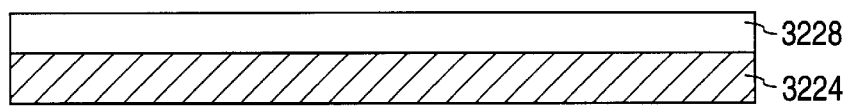
Figure 29D:
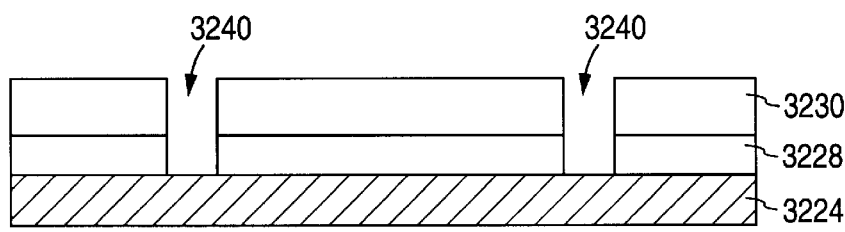

FIG. 29C shows deposition of a TEOS cap, followed by chemical mechanical polishing of the TEOS to further planarize intermetal dielectric 3228. FIG. 29D illustrates the patterning of a photoresist mask 3230 over the planarized surface of highest intermetal dielectric 3228, followed by etching to create vias 3240.

Figure 29E:
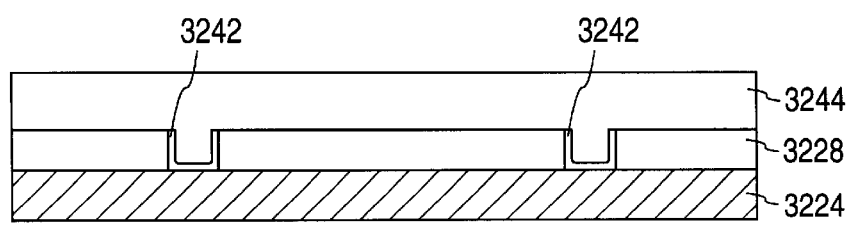
Figure 29F:
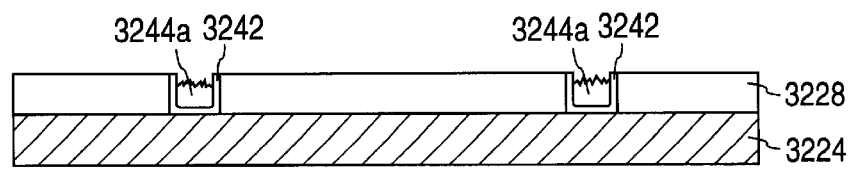
Figure 29G:
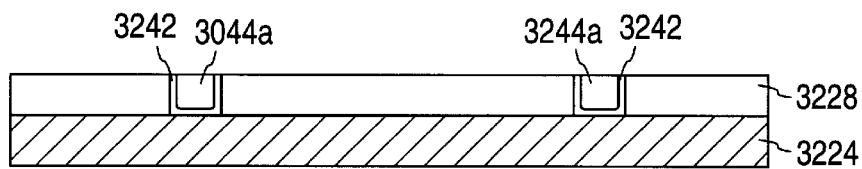

FIG. 29E illustrates formation of a liner layer within vias 3242, followed by the formation of a layer of Tungsten 3244 over the highest intermetal dielectric 3228, including vias 3242. FIG. 29F illustrates etchback of Tungsten layer 3244 to remove Tungsten outside of vias 3240. FIG. 29G illustrates CMP following Tungsten etchback to reduce roughness contributed by the remaining via liner layer 3242.

Figure 29H:
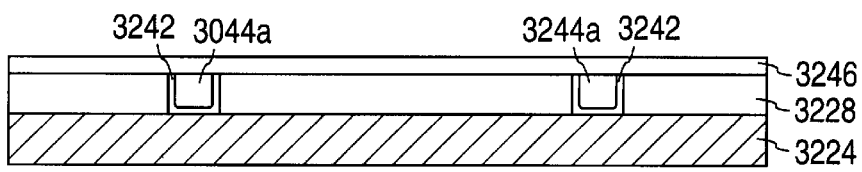

FIG. 29H illustrates formation of the pixel adhesion underlayer 3246 formed from a layer of collimated Titanium between approximately 100 Å and 400 Å thick.

Figure 29I:
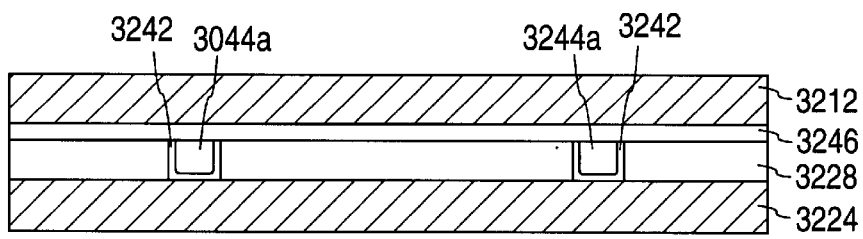

FIG. 29I shows formation of the pixel electrode layer 3212 on top of pixel adhesion underlayer 3246. Pixel electrode layer 3212 is formed by depositing an AlCu mixture at approximately 175° C.

Figure 29J:
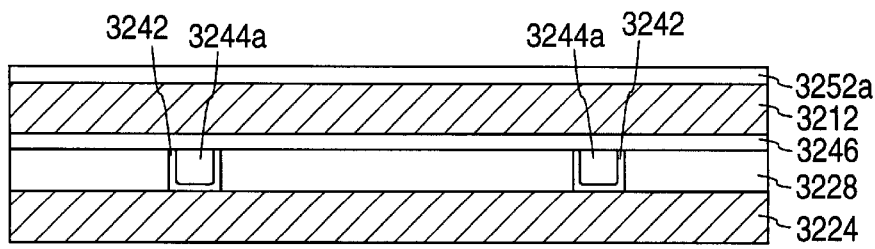

FIG. 29J illustrates formation of first dielectric film 3252a on top of freshly deposited pixel electrode layer 3212. First dielectric film constitutes the lowest layer of the REC, and is deposited at a temperature as close as possible to the temperature at which the pixel electrode layer is formed.

Figure 29K:
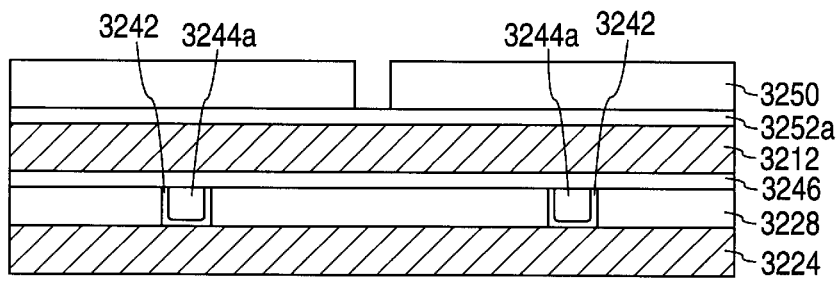
Figure 29L:
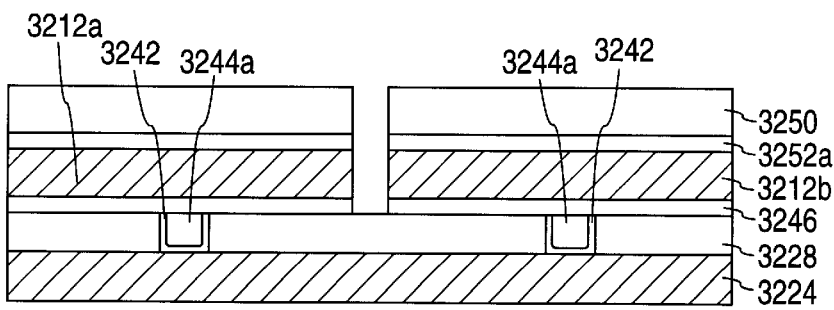

FIG. 29K illustrates the formation of pixel photoresist mask 3250 on top of first dielectric film 3252a. FIG. 29L illustrates etching of first dielectric film 3252a, pixel electrode layer 3212, and pixel adhesion layer 3246 in regions unmasked by pixel photoresist mask 3250. This etching step creates the individual pixel cells by defining individual pixel electrodes 3212a and 3212b from pixel electrode layer 3212.

Figure 29M:
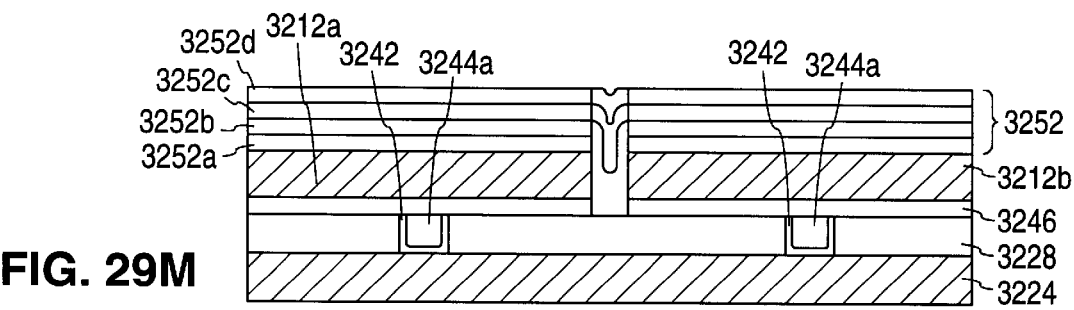

FIG. 29M shows completion of REC 3252 by forming second, third, and fourth dielectric films 3252b, 3252c, and 3252d respectively, on top of first dielectric film 3252d.

During this step, dielectric material from films 3252b, 3252c, and 3252d enters into the etched gap 3260, further electrically isolating pixel electrodes 3212a and 3212b.

Although the invention has been described above in FIGS. 29A–29M in connection with one specific preferred embodiment of the process in accordance with the present invention, it should be understood that the invention as claimed should not be unduly limited to this exact process flow. Various other modifications and alterations in the process of this invention will be apparent to those skilled in the art without departing from the scope and spirit of the present invention.

For example, the discrete steps of the process depicted in the preferred embodiment of the present invention may be employed separately, as well as in combination. Thus, CMP following SOG planarization of the underlying intermetal dielectric can improve reflectance independent of use in conjunction with CMP after W etchback and/or REC formation. Similarly, formation of the REC in accordance with the present invention can be performed independent of whether or not CMP after SOG planarization of intermetal dielectric and/or CMP after tungsten etchback is performed.

Furthermore, the process in accordance with the present invention is not necessarily limited to the precise order of process steps described above in FIGS. 29A–29M. For example, all of the REC layers could be deposited prior to the etch of the pixel electrode layer to create the individual pixel cells without departing from the scope of the present invention.

Moreover, the process in accordance with the present invention is not limited to the specific process parameters cited to describe the first embodiment. Deposition of the pixel electrode layer and REC can occur at any feasible processing temperature, with the primary limitation being smallness in the size of the metal grain formed, and maintenance of as small a difference as possible between the temperature of metal and REC formation in order to suppress the creation of hillocks.

Therefore, it is intended that the following claims define the scope of the present invention, and that the methods and structures within the scope of these claims and their equivalents be covered hereby.

What is claimed is:

1. A process of forming a reflective electrode comprising:
    forming a highest intermetal dielectric layer on top of a highest layer of interconnect metallization;
    planarizing the highest intermetal dielectric;
    creatine a via in the highest intermetal dielectric;
    lining the walls of the via with a liner layer;
    filling the via with an electrically conductive material;
    forming an electrode adhesion layer on top of the highest intermetal dielectric and the via;
    forming an electrode layer on top of the electrode adhesion layer; and
    forming a reflectance enhancing coating on top of the electrode layer, the reflectance enhancing coating generating constructive interference of light waves reflected by the electrode layer, and
    wherein the step of planarizing the highest intermetal dielectric includes the steps of forming SOG on top of the highest intermetal dielectric, etching the SOG and the intermetal dielectric, and chemical mechanical polishing the etched intermetal dielectric.

2. The process according to claim 1 further comprising the step of chemical mechanical polishing a top surface of the filled via prior to forming the electrode adhesion layer.

3. The process according to claim 2 wherein the step of forming an electrode adhesion layer includes forming a layer of collimated Titanium between approximately 100 Å and 400 Å thick.

4. The process according to claim 3 wherein the step of forming the electrode layer includes depositing metal at a first temperature, the first temperature maintained as low as possible such that the grain size and roughness of the electrode layer are minimized.

5. The process according to claim 4 wherein the step of forming the electrode layer includes depositing a mixture of approximately 99.5% aluminum and 0.5% copper by weight at a temperature of approximately 50° C.

6. The process according to claim 4 wherein the step of forming the electrode layer includes depositing a mixture of approximately 99.5% aluminum and 0.5% copper by weight at a temperature of approximately 175° C.

7. The process according to claim 4 wherein the step of forming the reflectance enhancing coating includes a step of forming a first dielectric film on top of the electrode layer.

8. The process according to claim 7 wherein the step of forming the first dielectric film includes depositing the first dielectric film at a second temperature as close as possible to the first temperature, such that formation of hillocks in the electrode layer is suppressed.

9. The process according to claim 8 wherein the step of forming the electrode layer includes depositing a mixture of 99.5% aluminum and 0.5% copper by weight at approximately 50° C., and the step of forming the first dielectric film includes depositing the first dielectric film at a temperature of approximately 300° C.

10. The process according to claim 8 wherein the step of forming the electrode layer includes depositing a mixture of 99.5% aluminum and 0.5% copper by weight at a temperature of approximately 175° C., and the step of forming the first dielectric film includes depositing the first dielectric film at a temperature of approximately 300° C.

11. The process according to claim 7 wherein the step of forming the reflectance enhancing coating further includes the steps of forming the first dielectric film of $SiO_2$ on top of the electrode layer, forming a second dielectric film of $Si_3N_4$ on top of the first dielectric film, forming a third dielectric film of $SiO_2$ on top of the second dielectric film, and forming a fourth dielectric film of $Si_3N_4$ on top of the third dielectric film.

* * * * *